United States Patent [19]
Kamo et al.

[11] Patent Number: 6,012,124
[45] Date of Patent: Jan. 4, 2000

[54] DISK SYSTEM WITH ACTIVATION CONTROL OF DISK DRIVE MOTORS

[75] Inventors: Yoshihisa Kamo, Musashimurayama; Hitoshi Kakuta; Atsushi Tanaka, both of Kokubunji; Yosuke Seo, Sagamihara, all of Japan

[73] Assignee: Hitachi, Ltd., Tokyo, Japan

[21] Appl. No.: 08/934,201

[22] Filed: Sep. 19, 1997

Related U.S. Application Data

[60] Continuation of application No. 08/472,460, Jun. 7, 1995, Pat. No. 5,673,412, which is a division of application No. 07/725,672, Jul. 3, 1991, abandoned.

[30] Foreign Application Priority Data

Jul. 13, 1990 [JP] Japan ..................................... 2-183936
Oct. 1, 1990 [JP] Japan ..................................... 2-260439

[51] Int. Cl.[7] ............................... G06F 12/00; G06F 1/32
[52] U.S. Cl. ........................... 711/114; 711/112; 713/300; 713/330; 360/97.03; 360/98.01
[58] Field of Search .................................. 711/114, 112; 395/750.01, 750.07; 360/98.01, 97.03, 78.04, 98.05, 99.03, 98.07; 713/300, 330

[56] References Cited

U.S. PATENT DOCUMENTS

| | | |
|---|---|---|
| Re. 34,399 | 10/1993 | Gami et al. . |
| 3,710,214 | 1/1973 | Anderson ................................ 318/102 |
| 5,148,432 | 9/1992 | Gordon et al. . |
| 5,227,930 | 7/1993 | Thanos et al. . |
| 5,239,659 | 8/1993 | Rudeseal et al. . |
| 5,246,479 | 9/1993 | Gami et al. . |
| 5,423,046 | 6/1995 | Nunnelley et al. ................. 395/750.07 |
| 5,488,274 | 1/1996 | Satoh ....................................... 318/101 |
| 5,491,593 | 2/1996 | Donaldson ............................ 360/73.03 |

FOREIGN PATENT DOCUMENTS

| | | |
|---|---|---|
| 51-7071 | 2/1976 | Japan . |
| 1-250128 | 10/1989 | Japan . |

*Primary Examiner*—Ayaz R. Sheikh
*Assistant Examiner*—Ario Etienne
*Attorney, Agent, or Firm*—Fay, Sharpe, Beall, Fagan, Minnich & McKee

[57] ABSTRACT

With respect to the disk drives provided power from a single power source in a disk drive system, start up power is first supplied to a first start-up group of the disks, preferably comprising all of the master disks, with the size of the group being selected so that the required current does not exceed the capacity of the power source. When the disk drives of the first group have substantially reached steady state, start-up is conducted with respect to a second start-up group of the disk drives so that the current required during start-up for the second group and the current required for steady state drive of the first start-up group does not exceed the capacity of the power source. With respect to each start-up group, the number of disk drives is the maximum integer value and decreases or remains the same with respect to subsequent start-up groups. When simultaneously transferring subdivided data in parallel to all of the disk drives of a parity group, respectively, seek operations in such a system are prevented from occurring simultaneously by offsetting the indices on the disks, by varying the seek operation start timing or by varying the head addresses for the start of reading and writing, all within one revolution, but the seek operations are ended at the same time, to reduce peak current requirements of the power source.

12 Claims, 17 Drawing Sheets

DISK SYSTEM WITH ACTIVATION CONTROL OF DISK DRIVE MOTORS

This is a continuation application of U.S. Ser. No. 08/472,460, filed Jun. 7, 1995 U.S. Pat. No. 5,673,412 which is a divisional application of U.S. Ser. No. 07/725,672, filed Jul. 3, 1991 now abandoned.

BACKGROUND OF THE INVENTION

This invention relates to an external memory unit for a computer or high-performance computer system, and more particularly to an array disk system employing a large number of small disk drives and a maximum power supply current requirement control, e.g. with respect to power on or head seek.

In current computer systems, the data required by the host side, e.g., by the CPU (central processing unit), is stored in a secondary storage system and the data is written to and read from the secondary storage system as required by the CPU.

The increasing sophistication of information systems in recent years has led to a need for higher performance secondary storage systems. One answer to this need is the array disk system which, as will be clear from the following description, consists of a large number of relatively small capacity magnetic disk drives. The array disk system is used for conducting parallel processing. Specifically, the data transferred from the CPU is subdivided and simultaneously stored in a plurality of magnetic disk drives and, during data read, the subdivided data is simultaneously read from the magnetic disk drives regenerated to obtain the original data from the data read simultaneously from the disk drives and transferred to the CPU at high speed. The magnetic disk drives that carry out this parallel processing are divided into groups as indicated in FIG. 12(a). Each group constitutes a unit within which all member magnetic disk drives operate in the same manner.

The secondary storage system generally uses nonvolatile storage media, typically magnetic disk drives, optical disk drives or the like.

This type of array disk system is discussed, for example, by D. Patterson, G. Gibson and R. H. Kartz in a paper titled *A Case for Redundant Arrays of Inexpensive Disks (RAID)* read at the ACM SIGMOD Conference, Chicago, Ill., (June 1988). This paper reports on the results of studies into the performance and reliability of both array disk systems which subdivide and process data parallely and array disk systems which independently treat distributed data. The two array disk systems referred to in this paper are considered to be the most common types in use today.

The array disk system which subdivides data and processes the subdivided data parallely will now be explained. The array disk system has a large number of relative small capacity magnetic disk drives. As shown in FIG. 14, the data transferred from the CPU is subdivided and simultaneously stored in parallel in a plurality of data disk drives 7 and a parity disk drive 8 that constitute a parity group 4. During data read, the procedure is reversed, i.e., the subdivided data is simultaneously read in parallel from the disk drives regenerated to obtain the original data from the data read simultaneously from the disk drivesand transferred to the CPU. This parallel processing enables the data to be transferred at high speed. For enhancing the reliability of the array disk system, parity data is generated from the subdivided data and stored in the parity disk drive P (8). In this way, when a problem arises making it impossible to read data from one of the magnetic data disk drives D (7) among those in which the subdivided data is stored, the data stored in the disabled magnetic disk drive can be reconstructed from the data stored in the remaining magnetic disk drives 7 and the parity data of disk drive 8. The provision of parity disks is necessary for improving the reliability of a system which, like the array disk system, consists of a large number of magnetic disk drives.

Systems in which a high transfer rate is realized by simultaneously conducting reading and writing with respect to any array of disks are disclosed in Japanese Unexamined Patent Public Disclosure 1(1989)-250158 and Electronic Design, Nov. 12, 1987, p. 45. As shown in FIG. 2, these types of systems define a plurality of disk drives 211–215 as an array. Preferably a rotation synchronize circuit 220 rotation-synchronizes these disk drives with respect to an external reference clock or with respect to one disk drive among the plurality of disks making up the array. A sequencer 240 subdivides the data transferred from the host 210 through an interface 230 into bits, bytes, blocks or some other arbitrary unit, and also generates parity or other such ECC (error checking and correction) data. These data are written to the disk drives 211–214 substantially simultaneously by disk drive control circuits 250. During regeneration, the sequencer 240 reconstructs the original data from data read simultaneously from the disk drives and outputs the regenerated data to the host through the interface 230. The buffer 260 is situated between the control circuits 250 and the sequencer 240 for absorbing rotational discrepancies among the disks. The interface 230, sequencer 240, control circuits 250 and buffers 260 are controlled by a processor 270.

When reading and writing of data are conducted with respect to N+1 disks (+1 indicating the parity disk 215) in this manner, the apparent transfer rate becomes N times the transfer rate of the individual disk drives. Moreover, the provision of a redundant disk (the parity disk 215 in this example) makes it possible to ensure accurate data regeneration even if one disk drive should break down.

Further, as shown in FIG. 3, COMPCON '89 Spring, Feb. 1989, p118 discloses an arrangement in which a plurality of interconnected disk drive arrays 281–284 (which will be referred to as parity groups) are each constituted in the manner of FIG. 2. High-speed transfer is realized by having the disks within the parity groups 281–284 simultaneously conduct read and write operations. When a disk within a group breaks down, the data is reconstructed within the group concerned. This reference further discloses the formation of separate groups 291–295 (which will be referred to as power groups) constituted perpendicular to the parity groups. Each power group constitutes a separate unit as regards the supply of electric power for the disk drives and the cooling fans. This arrangement limits the effect of the breakdown of a single power group to making it impossible to read the data of only one disk in each parity group. As a result, the aforesaid data error checking and restoration capability remains intact and the data can be regenerated.

SUMMARY

The aforesaid arrangements do not, however, take into account the fact that the initial current becomes large when the large number of disk drives are simultaneously started up. As shown in FIG. 4, the power supply current required immediately after start-up of a disk drive is more than twice that during steady state operation. This large current following start-up continues to flow for no more than several tens of seconds. Assume that a single power supply serves D number of disk drives (D being equal to the number of parity groups), that the steady state current value is I(A), and that a current equal to k times the steady state current is required immediately after start-up. The power supply is thus required to be capable of supplying, albeit for only a short period, a current of I×k×D (A).

Japanese Unexamined Patent Publication Disclosure 57(1982)-3265 discloses a technique for staggering the times at which power-on is conducted with respect to the disk drives. While this method makes it possible to reduce the required capacity of the power supply, it considerably prolongs the time required for start-up of the entire system when applied to a system which, like the array disk system, has a large number of disk drives that have to be supplied with power.

An object of this invention is to provide an array disk system and control the same to reduce the amount of electric current required by the array disk system, e.g. the amount of electric current required thereby during a power-on sequence for the disk system which enables the disk system to be started up within a prescribed period of time using relatively small power supplies.

For achieving this object, the present invention divides the disk drives within the disk system into a number of groups and separately starts up the respective disk drive groups.

The number of disk drives constituting the individual groups ordinarily decreases in the order that the groups are started up. This is because, for example, the reserve power of the power supply after the start-up of the first group is equal to the rated capacity of the power supply minus the amount of current required for maintaining the disk drives of the first group in the steady state. It suffices to set the number of disk drives in the first group to be started up so as not to exceed the capacity of the power supply being used. This number can be decided by the following method.

Assume that D disk drives are started up using a single power supply, that the steady current per disk drive in the steady state is I(A), and that an initial current k times as large as the steady state current is required at the time of start-up. Then, if the number of disk drives first started up is set at D/k, the current at the time of start-up will not exceed the amount of current when all of the disk drives are operating in the steady state, namely, will not exceed ID(A).

Next, the manner for determining the number of disks to be included in the second and following groups to be started up will be explained. Basically, it suffices if the number of disk drives in the second and following groups to be started up is such that the amount of current required for starting up the disk drives does not exceed the reserve capacity of the power supply. For optimum effect, however, the following method can be considered. After the first group of D/k disk drives have reached the steady state (e.g., after several tens of seconds), the next group of disk drives is started up. It then basically suffices to set the number x of disk drives in this next or second group as the number obtained by dividing the reserve current capacity of the power supply when D/k disk drives are operating in steady state by kI. This can be expressed by the following equation:

$$x = 1/k \ (1-1/k)D$$

Since only an integral number of disk drives is possible, any decimal amount in the value of D/k is dropped, i.e., the value obtained from the foregoing equation is rounded down. When this method is used for determining the numbers of disk drives, it may happen that a single disk drive remains at the end. For starting up this disk drive, however, a maximum power supply current of I(D−1+k) (A) is sufficient.

One disk drive of a parity group is sometimes designated as a master disk and subjected to rotation synchronization. In such case, this master disk has to be started up prior to the other disks. If the number of master disk drives is such that they can all be started up simultaneously, therefore, the master disk drives are included in the first group to be started up. Alternatively, it is possible to start up the master disk drives one by one before starting up the other disks.

Since the disk drive groups are started up at different times to prevent overlap of the initial currents, the maximum current output of the power supply can be reduced. Since the disk drives are organized into a number of groups, the disk system can be started up within a prescribed period of time.

An example magnetic disk drive of a type illustrated herein requires a maximum current of 4.5 A, which breaks down to 1 A for rotating the disks, 2.8 A for seek operation and 0.7 A for other purposes. When seek operation occurs simultaneously with parallel processing in an array disk system consisting of a large number of such disk drives, a very large current becomes necessary. Moreover, as protection against power outages or other such mishaps that might occur during the operation of such an array disk system, it is necessary to provide battery backup for enabling data in the course of storage to be completely stored. For supply of such a large amount of current, it is necessary to use a very large battery.

An object of this invention is to provide an array disk system and control the same to reduce the amount of electric current required by the array disk system, particularly the amount of electric current required thereby during seek operation, and also in this way to reduce the capacity required of a battery provided as a backup power source for use during power outages and the like.

For achieving the aforesaid object, the present invention provides an array disk system, as shown, for example, in FIGS. 12(a), (b), and (c) that has a large number of disk drives divided into a plurality of groups provided with control such that the timing of the start of seek operations for moving the read/write heads to change the track positions at which the read/write heads are located is varied among at least some of the groups and such that, within each group, the timing of the start of seek operations is the same for all of the disk drives or is varied among at least some of the disk drives.

The control for causing the seek operation start timing to vary among the groups or among the disk drives of a group can be provided by rotation-synchronizing the disk drives such that the positions of indices provided on the disks as references for the start of data read/write are offset among the groups or among the disk drives.

In this case, parallel processing can be readily conducted by providing the controller with data processing which simultaneously stores the subdivided data simultaneously transferred to the respective groups in buffer memories within the respective groups and conducts read/write processing of the data from the buffers in accordance with the positional offset of the indices.

Alternatively, the control for causing the timing of the start of the seek operations to vary among the groups or among the disk drives of a group can be provided, as shown in FIGS. 18(a) and (b) for example, by deliberately offsetting the seek operation start timing among the groups or among the disk drives, without offsetting the positions of the indices on the disks. Since all of the indices are positionally aligned in this case, there is the advantage that rotation synchronization control is easy to conduct.

Further, the control for causing the timing of the start of the seek operations to differ among the groups or among the disk drives of a group can be provided, as shown in FIGS. 19(a) and (b) for example, by varying the head addresses for the start of data reading and writing among the groups or among the disk drives, without offsetting the positions of the indices on the disks among the groups. This method simplifies the control since the head addresses can easily be varied among the groups by software techniques.

The control used by the invention for achieving the aforesaid objects is further characterized in that the seek operations for moving the read/write heads to change the track positions at which the heads are positioned are prevented from occurring simultaneously in at least some of the disk drives.

For preventing seek operations from occurring simultaneously the control will offset the position of the indices on the disks, to vary the seek operation start timing or vary the head addresses for the start of reading and writing.

In preventing seek operations from occurring simultaneously, it is preferable from the point of reducing electric power consumption to divide the large number of disk drives into group units, each of a plurality of the disk drives, to prevent seek operation from occurring simultaneously among the groups, and to make the division of the disk drives into groups such that the seek operations occur in different groups at different times within the period of one disk revolution and all of the seek operations occurring at different times are completed within the same period.

In a disk system which conducts parallel processing, the positional relationship among the heads situated over the disks is generally such that the many disk drives making up the system operate as if they were an integrated unit. Specifically, the disks are rotation-synchronized with each other and the heads operate such that their track position relationships are all the same. In such a system, if the many disk drives which conduct parallel processing are divided into a number of groups and each group is treated as a separate read/write unit, the time for conducting seek operation is offset among the groups so that the occurrence of a large seek current by the simultaneous occurrence of the many seek currents in the individual disks can be avoided. Therefore, the supply of current to the array disk system as a whole is lowered and the capacity required of a battery for providing backup power during power outages and the like can be reduced.

Offsetting the positions of the indices on the disks among the groups makes it possible to offset among the groups the timing at which seek operation starts for data exchange between the heads and the tracks during one revolution and, thereby, to hold the seek current to a low level.

As explained above, a prescribed seek time is required within each revolution for conducting a seek operation. During this time, the disk continues to rotate irrespective of whether or not data is being exchanged. It is thus preferable to make effective use of this period during which data is not being processed for carrying out the seek operation separately in each group. If this expedient is adopted, then, by deliberately offsetting the timing at which the seek operation is conducted among the groups within this period, it becomes possible, without offsetting the positions of the indices, to use this period to good advantage and thus to reduce the seek current.

Since in one and the same disk drive the seek operation is conducted after the head at a specific head address (e.g., the bottommost head in FIG. 2) has completed data exchange with a track on the disk, changing the head address at which data read/write is started among the groups changes the timing at which seek operation is conducted among the groups, so that the seek current can be reduced.

Up to this point, the explanation has been directed to the case where the seek operation timing is varied among the groups. It is, however, similarly possible to reduce the seek current by varying the seek operation timing among disk drives in one and the same group according to the above teachings.

Since reducing the seek current reduces the amount of electric power that has to be supplied to the array disk system as a whole, it decreases the capacity required of the backup battery for providing power during power outages and the like, increases the reliability of system operation during such emergencies, and enables the equipment for supplying power to be made more compact.

DETAILED DESCRIPTION OF THE PREFERRED EMBODIMENT

Figure 13:
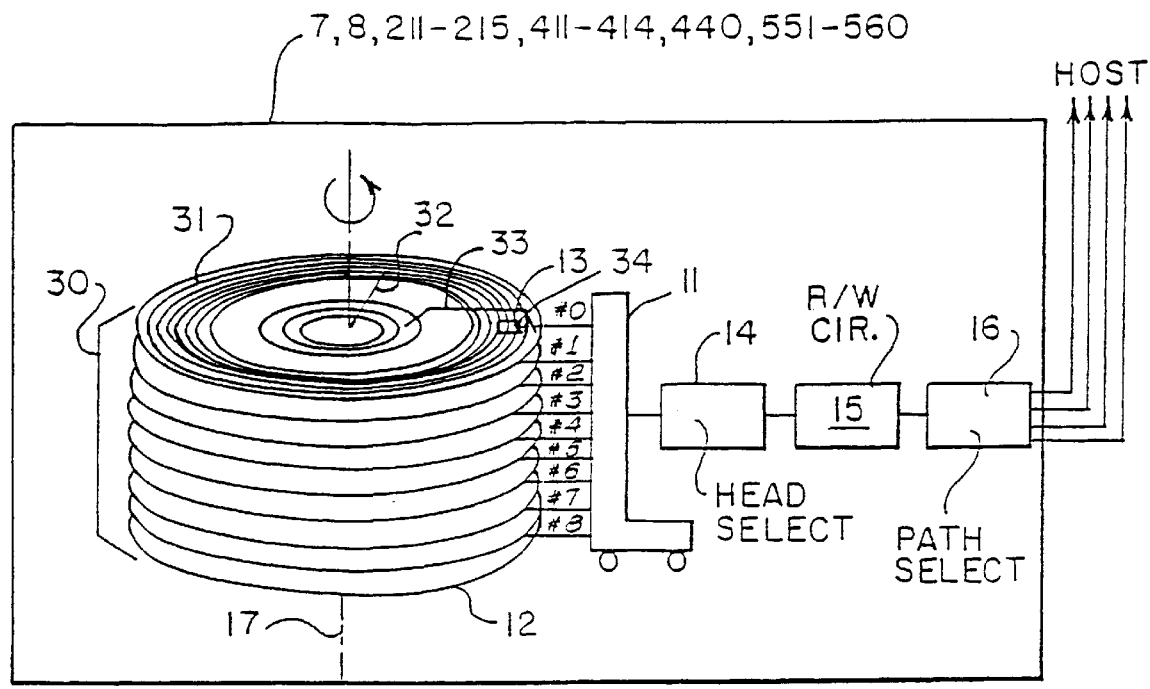
FIG. 13 is a schematic view of the interior of a data or parity disk dive.

FIG. 13 shows the internal structure of a data disk drive preferably used throughout this disclosure, for example a data disk drive 7 or a parity disk drive 8. A number of disks 12 rotate about a common shaft 17, and R/W (read/write)

heads 13 for reading and writing from and to the disks 12 are carried by an actuator 11. As used herein, the term head will refer to a single head for one surface as well as a pair of heads that service opposed surfaces of adjacent disks. The heads 13 are numbered, from top to bottom, #1 to #8. At least one R/W head 13 is required per side for each disk 12. All of the R/W heads 13 are moved in unison by the actuator 11. When read or write is conducted, the CPU 1 issues a data storage address and the R/W heads 13 go to this address. Specifically, a head selector 14 selects the head number corresponding to the head address included in the address issued by the CPU 1 and the actuator 11 carries out a seek operation by which the R/W head 13 is moved to the track corresponding to the cylinder address. When access by the storage address for the data has been completed, a path selector 16 selects the path to the host and the data is read or written by R/W circuit 15.

In a conventional manner, the disk drives 7, 8, 211–215, 411–414, 440, 551–560, shown in FIG. 13, are referred to with a head address 30, and access is with respect to a specific track 31 that defines a cylinder for all of the disks 12. An index 32 is provided on one or more or all of the disks 12 of the disk drive positioned to the head address 30, and there is a cylinder address 33. Each single head or head pair is supported on an arm 34 having its other end supported on the actuator 11, which moves radially with respect to the shaft 17 that rotatably supports the disks 12. As shown by the headed arrows, data, address and control signal lines are connected to a suitable bus, for example leading to the host.

Figure 12A:
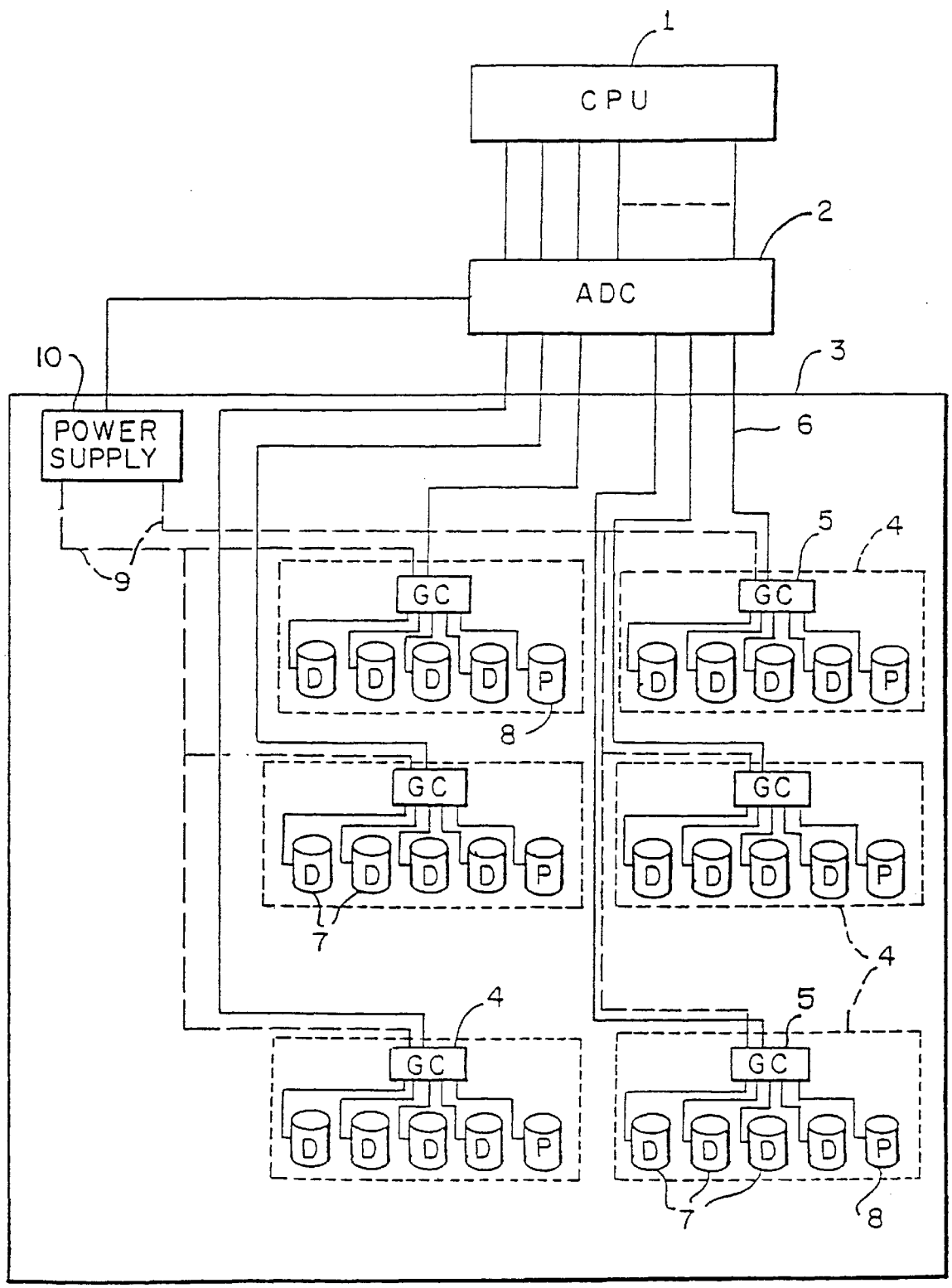
FIGS. 12(a) is a block diagram of a system portion of the invention relating to data storage.

In the case of an array disk system having the array disk controller ADC2 and array disk unit ADU3 of FIG. 12(a) which conducts parallel processing, the CPU 1 issues the read or write request to a disk drive parity group 4 made up of a number of data disk drives 7 and a parity disk drive 8 and which disk drive parity group 4 constitutes a single parallel processing unit. Within the group 4, a read or write request is issued by the group controller GC5 to each data disk drive 7 and the parity disk drive 8, and read or write processing of the type described above is conducted simultaneously with respect to all of the data disk drives 7 and the parity disk drive 8 in the group 4. For this purpose, it is necessary to rotation-synchronize the disks 12 of the data disk drives 7 and parity disk drive 8 within the parity group 4 so that the same address is always being accessed in the data disk drives 7 and parity disk drive 8 within one access period, thereby to control the multi-disk system 2, 3 exactly as if it were a single disk drive.

An explanation will now be given on the problems that arise during reading and writing of data in this type of array disk system when the volume of data to be handled at one time becomes great.

When data is stored in the data disk drives 7 and the parity disk drive 8, it is first stored at the cylinder track under head #1 and then successively stored at the same cylinder tracks under heads #2, 3, 4, 5, 6, 7 and 8. When storage has been completed up to the cylinder track under head #8, the actuator 11 conducts a seek operation to move the R/W heads 13 to the adjacent cylinder, wherein data is similarly stored successively or in parallel at the tracks under heads #0, 1, 2, 3, 4, 5, 6, 7, 8. Reading of the stored data is carried out in a similar manner.

Thus, in the array disk system, when the amount of data to be simultaneously processed in data disk drives 7 is larger than the capacity of one cylinder or available area of the cylinder first accessed, an intermediate seek operation is necessary for moving to the adjacent track.

Figure 1:
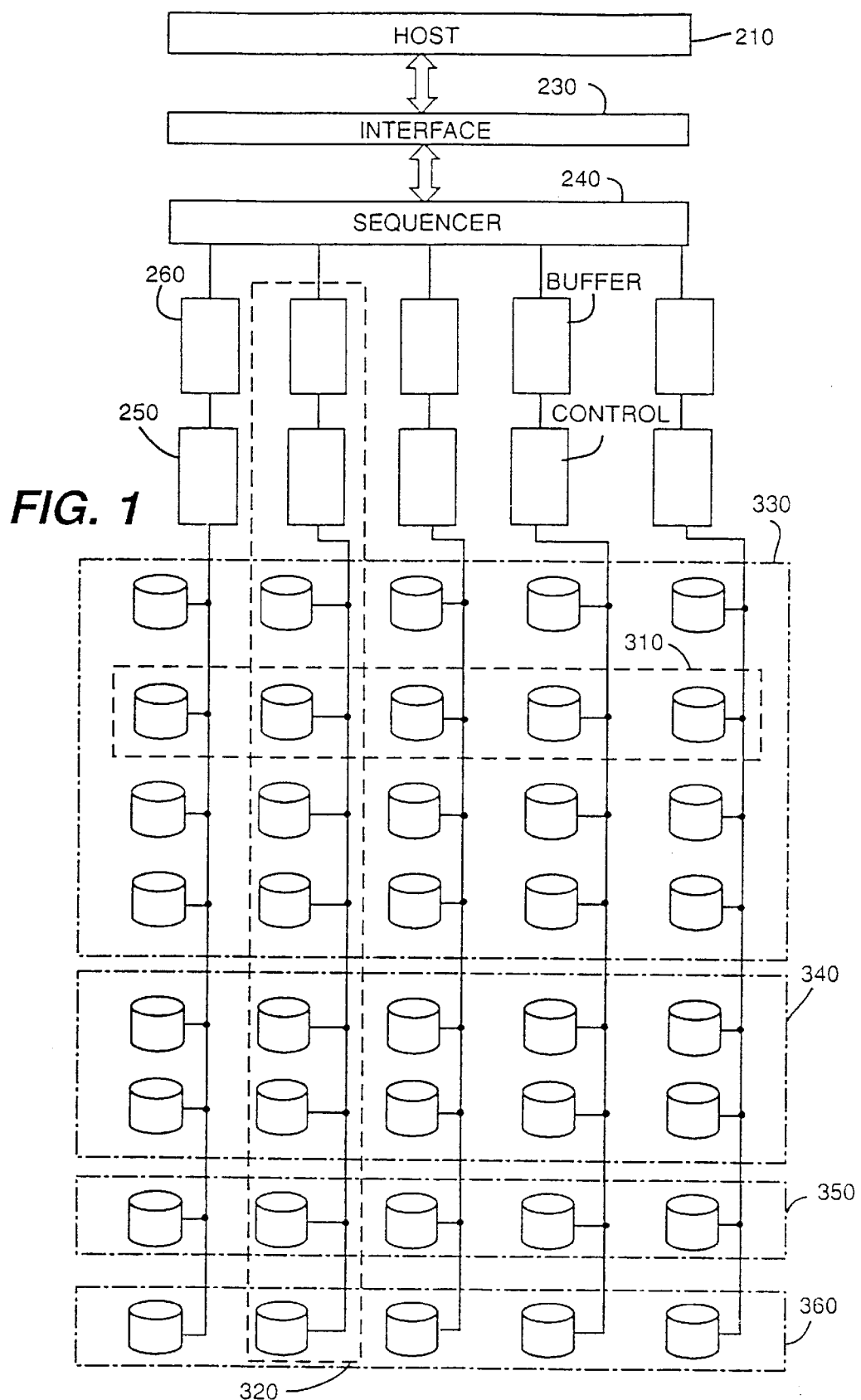
FIG. 1 is a schematic view for explaining a disk system according to the invention.
Figure 2:
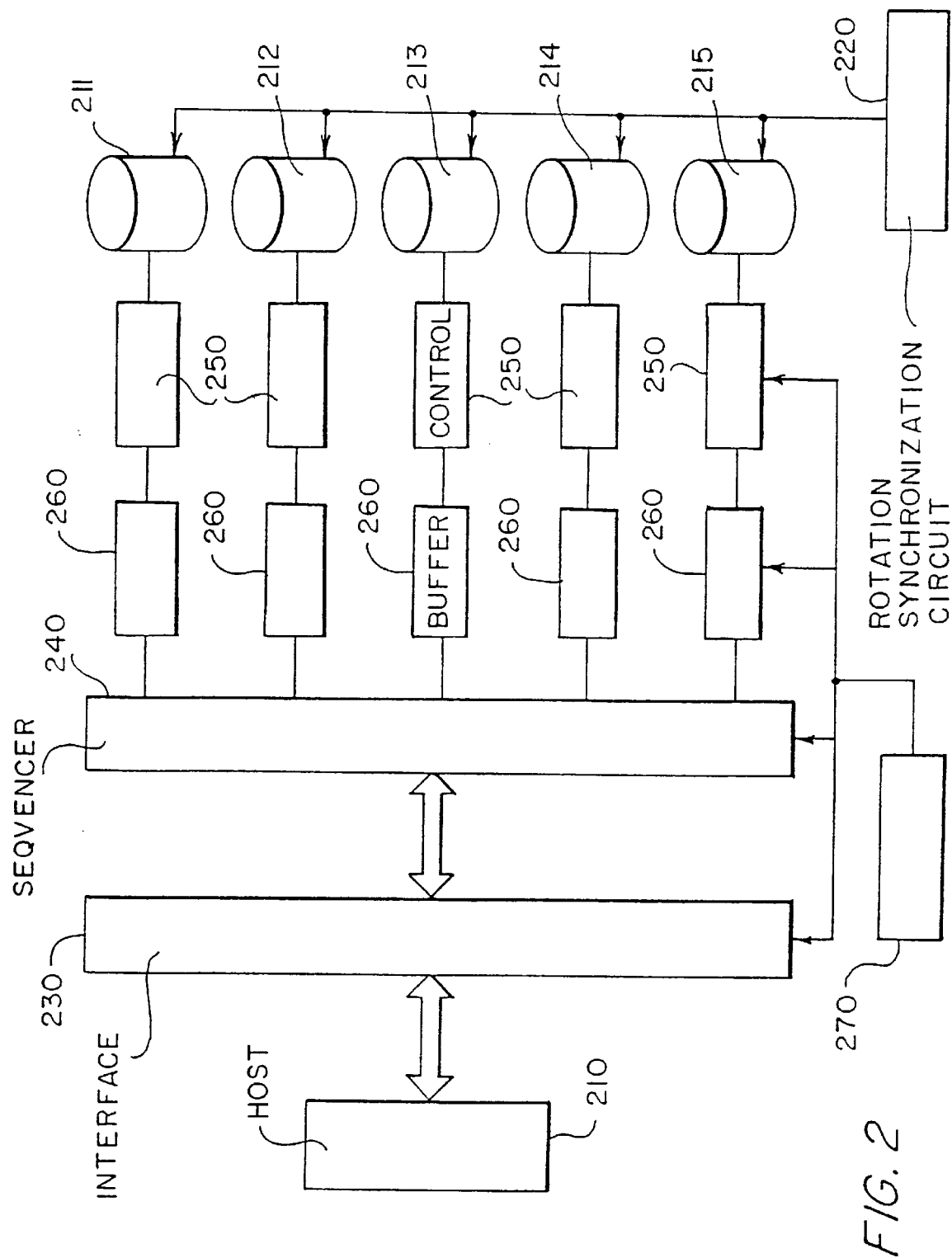
FIGS. 2 and 3 are schematic views useful in explaining problems solved by the present invention.
Figure 3:
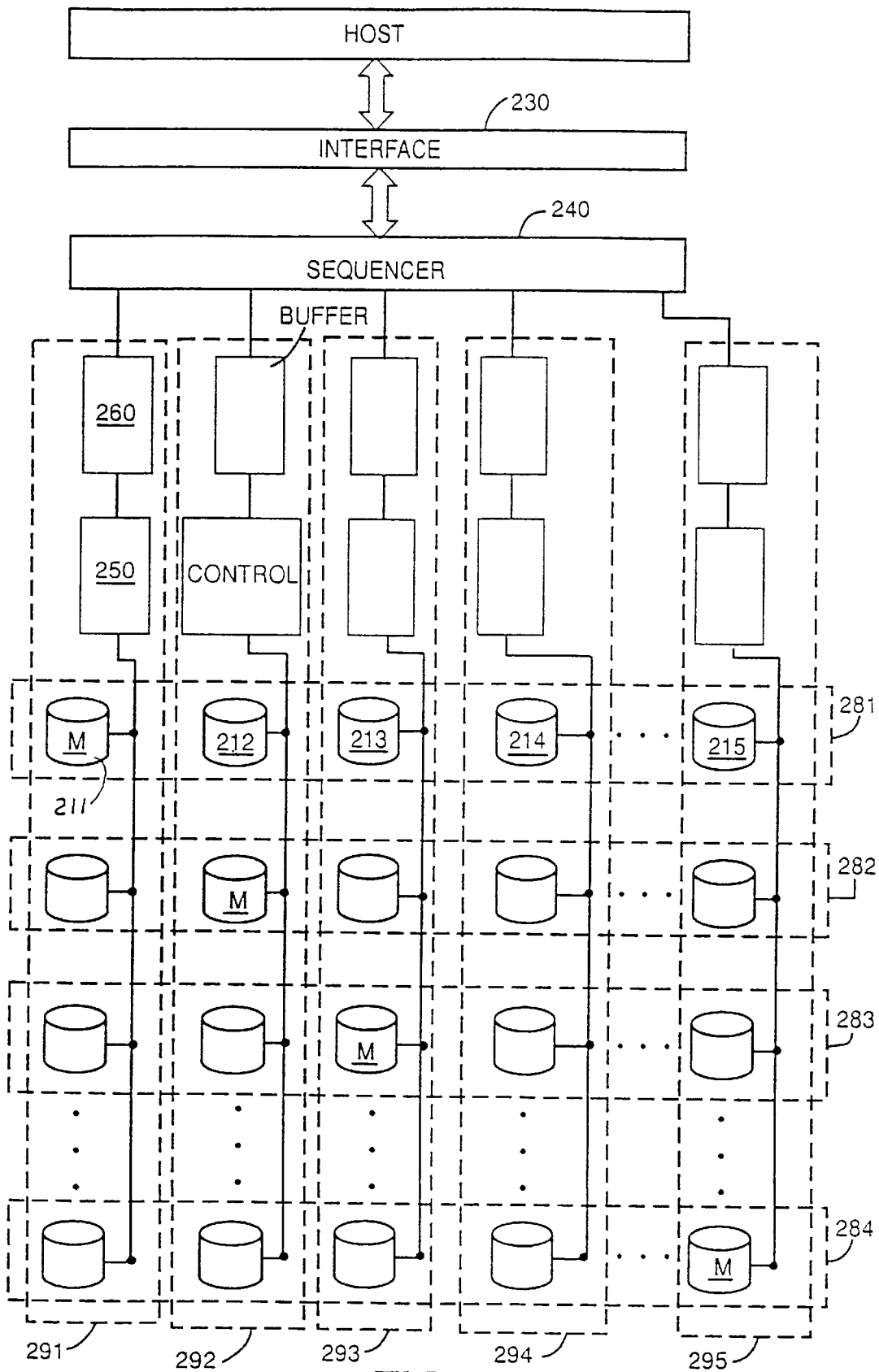
Figure 4:
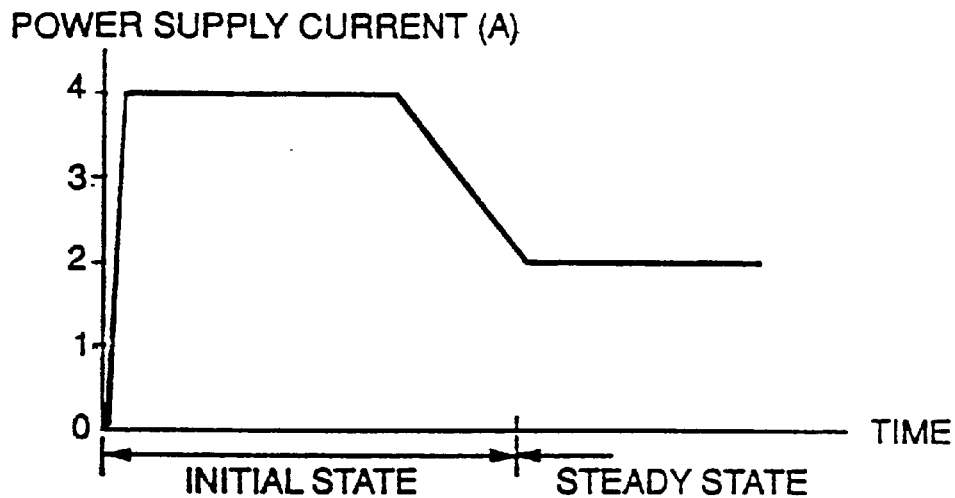
FIG. 4 is a graph for explaining current characteristics of the spindle motor of a disk drive immediately after start-up.

A system for the invention is shown in FIG. 1. The power supply current (in lines 9 from power supply 10 of FIG. 12(a) e.g.) per magnetic disk drive immediately after start-up in this embodiment exhibits the characteristics shown in FIG. 4. The required power supply current, for this example, is 2A during steady state operation and 4A during initial state operation (start-up). The initial state current of 4A continues to flow for 30 seconds. The manner in which the magnetic disk drives are arrayed in this example of FIG. 1 is similar to that in the example illustrated in FIG. 3. Each parity group 310 includes five disk drives, each steady state power group 320 includes eight disk drives, and the total number D of disk drives is forty. As there are five power groups, without the application of this invention it would ordinarily be necessary to provide 5 power supplies, each with the capacity to supply up to 4(A)×8 (drives)=32 (A). Being common to the whole system, the interface 230 and the sequencer 240 should preferably be provided with a power supply separate from that for the magnetic disk drives so as to establish a dual power system. Even though the buffer and control circuits are paired, with each pair connected with the disk drives of a respective power group, they are logical circuits and should therefore have a different voltage power supply. If to the contrary they are to be supplied with decreased voltage from the power supply for starting up the disk drives, it is necessary to take the current they require into account in determining the required current capacity of the power supply. Herein, when we talk of current capacity or the like of a power supply we are really talking about that available for the disk drives. Although the current required by these logical circuits varies with their size, it is at any rate much smaller than the currents required for driving the disk drive spindle motors. In this embodiment, the current required for the logical circuits is not more than 0.3 A.

Figure 5:
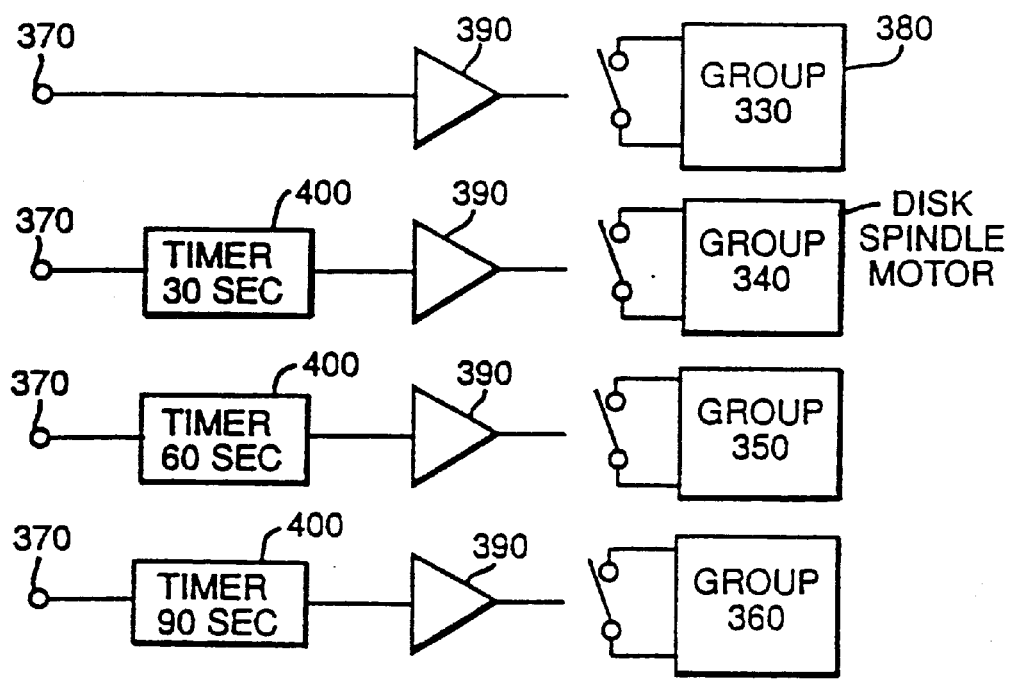
FIG. 5 is a block diagram for explaining a motor drive control circuit.

When the present invention is applied, the number and sequence of the disk drives simultaneously started up in each power group 320 can be 4, 2, 1, and 1. As shown in FIG. 1, the disk drives are organized from the top down into groups 330, 340, 350 and 360, consisting of 4, 2, 1 and 1 parity groups 310 of disk drive(s), respectively. Further, as can be seen in the motor drive control circuit shown in FIG. 5, the time between power switch-on of the overall system and the start of driving of the disk spindle motors is set independently for each of the groups 330, 340, 350 and 360 to prevent overlap of the initial currents among the groups. In the present embodiment, a delay of 30 seconds is established between successive groups. The spindle motors 380 of group 330 are turned on by a driver 390 almost simultaneously with receipt of the power-on signal 370. The spindle motors 380 of group 340 are turned on after a timer circuit 400 has counted off 30 seconds following receipt of the power-on signal 370. In the same manner, the spindle motors 380 of group 350 are turned on after a delay of 60 seconds and those of group 360 after a delay of 90 seconds.

Figure 6:
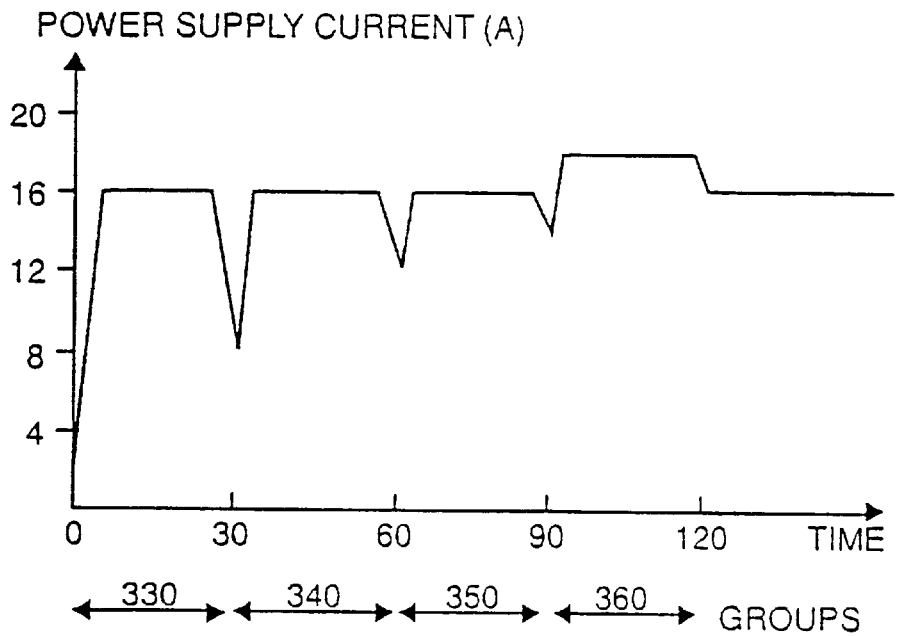
FIG. 6 is a graph for explaining variation of the power supply current.

The time course variation in the initial current of the power supplies of the respective power groups during this process was as shown in FIG. 6. As can be seen, it rose no higher than 18 A, which is roughly 50% less than that should the invention not have been applied. The time required for all of the disk drives to reach their rated rotational speed was 30 seconds×4 groups=2 minutes. After start-up the steady state current was 16 A. In comparison, if an attempt should be made to limit the power supply current to the same level without application of the invention, the disk drives would have to be started up one by one and the time required for all of the disk drives to reach their rated rotational speed would be 30 seconds×8 disk drives=4 minutes. The reduction in time is thus also 50%.

In the foregoing explanation the numbers of disks simultaneously started up were 4, 2, 1 and 1. If the power supplies have adequate capacity, however, it is alternatively possible to start up the disk drives in three power groups of 4, 2 and 2 disks. While this increases the required amount of power supply current to 20 A, it reduces the time required for all disk drives to reach their rated rotational speed to 1 minute 30 seconds. From this it will be understood that the numbers of disks to be simultaneously started up can be varied in light of the size of the power supply and the required start-up time.

Figure 8:
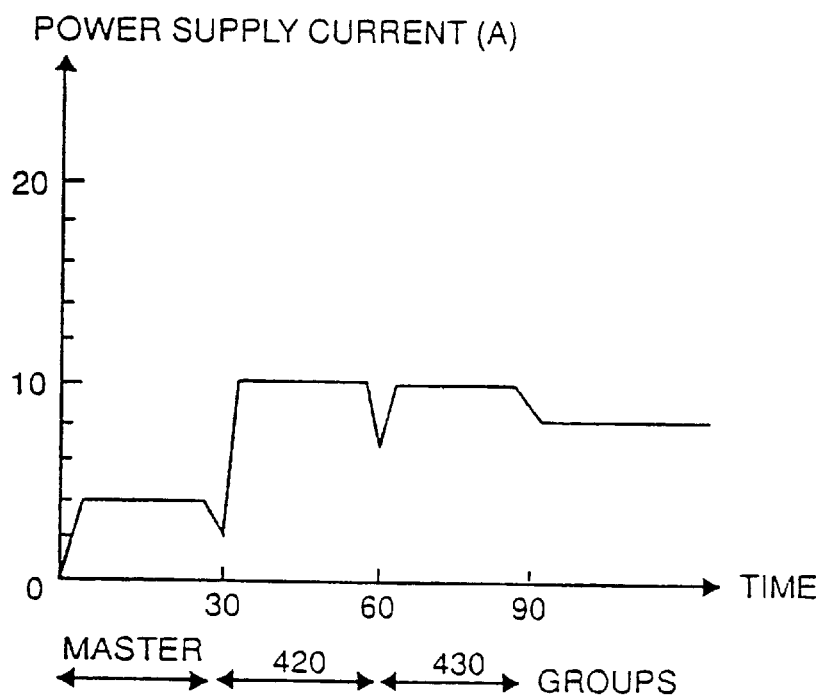
FIG. 8 is a graph for explaining variation of the power supply current in the invention.
Figure 7:
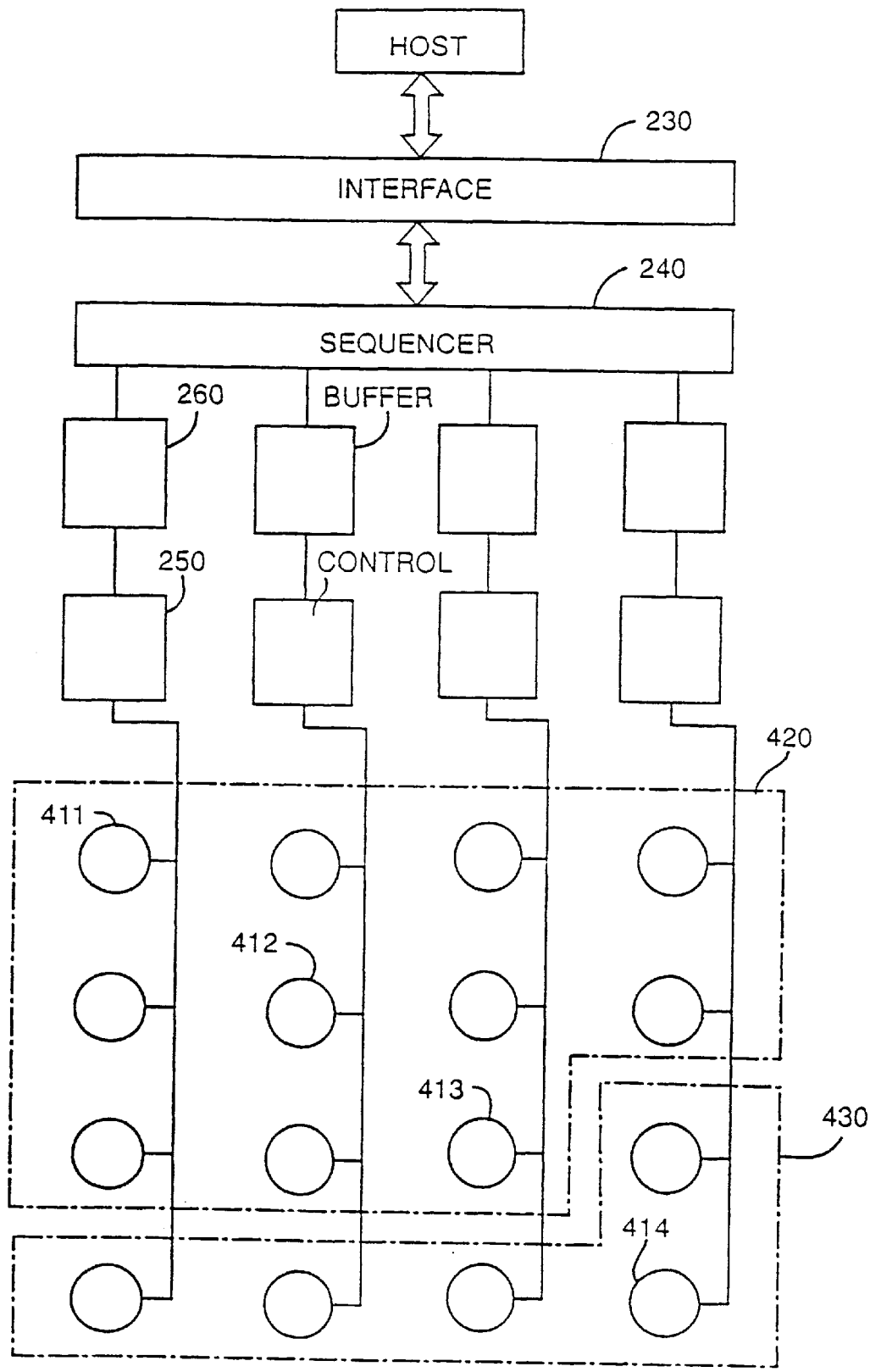
FIG. 7 is a schematic view of a disk system for explaining the invention.

In FIG. 7, each disk drive is represented by a circle, and one disk drive in each parity group is designated as a master and subjected to rotation synchronization. Although the master can be any disk drive in the parity group, it has to be brought up to the rated rotational speed ahead of the other disk drives in the group. The method used when the invention is applied in such a case will now be explained. There are 4 parity groups (each parity group is in a single horizontal line) and 4 power groups (each power group is in a vertical line). The disk drives are of the same type as those in the first embodiment. In each parity group, the disk drive designated as the master is preferably started up before the others. In FIG. 7, the disk drives 411, 412, 413 and 414 lying on the diagonal at the intersections between the respective parity groups and power groups are selected as the masters. All of the masters are simultaneously started up. Following this, the remaining disk drives of group 420 are started up and thereafter the remaining disk drives of group 430 indicated in the same figure (remaining means other than those disk drives already started up) are started up. The time variation in the power supply currents of the respective power groups in this case is shown in FIG. 8, from which it will be noted that a maximum current of 10 A suffices and the steady state current after start-up is 8 A. If start-up should be carried out without application of the invention, 16 A would be necessary. The invention thus produces a pronounced effect in reducing power supply requirements.

Figure 9:
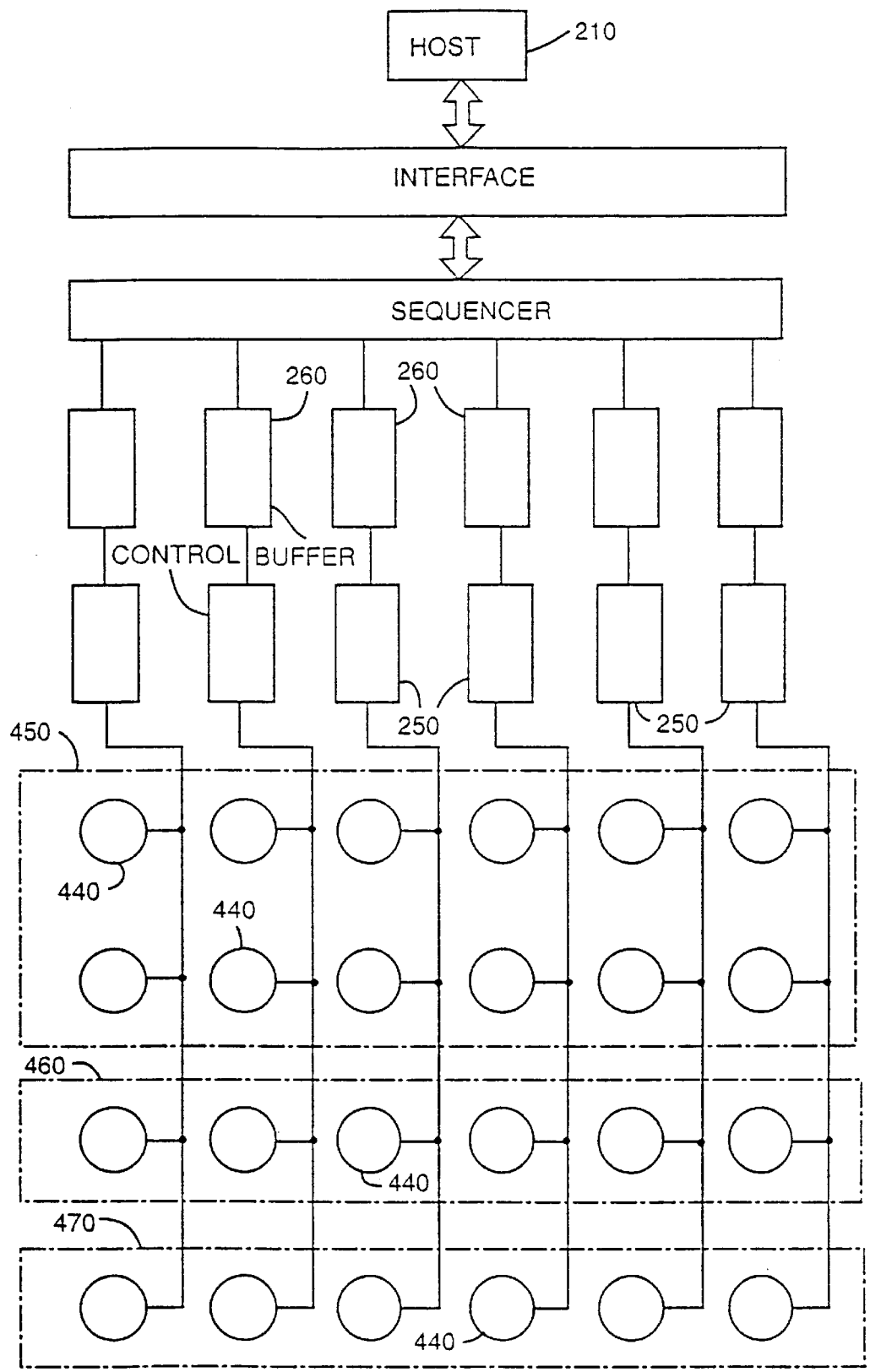
FIGS. 9 and 10 are schematic views of systems for explaining the invention.
Figure 10:
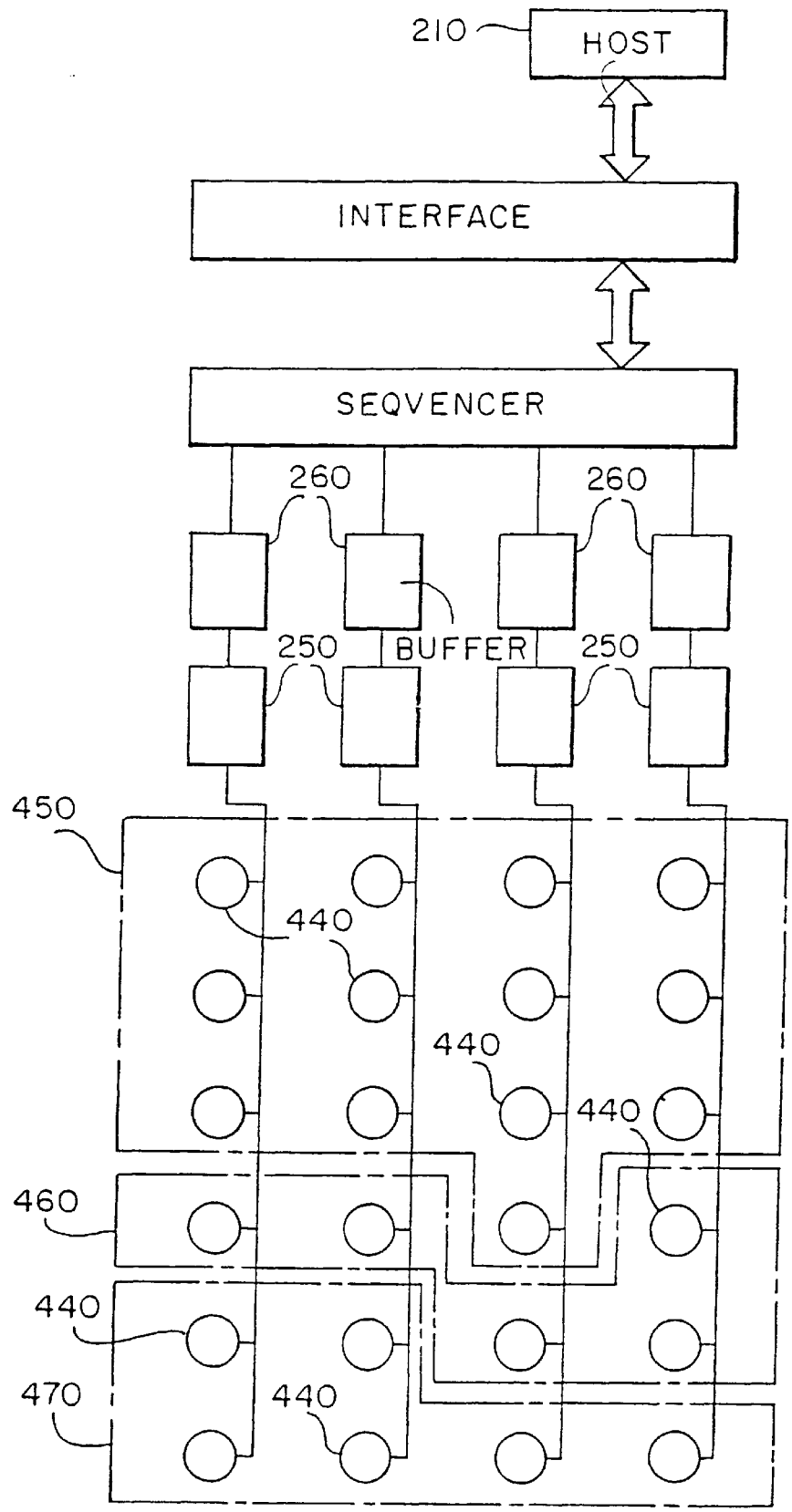

In contrast to the above examples, FIGS. 9 and 10 respectively relate to cases in which the number of parity groups is smaller and larger than the number of power groups. When a master disk drive 440 for rotational synchronization is designated in each parity group, the arrangement of FIG. 9 results in some power groups including no master disk drive 440 and that of FIG. 10 results in some power groups including more than one master disk drive 440. When the invention is applied to these arrangements, it suffices to establish the start-up groups 450, 460 and 470 shown in these figures and after start up of the masters, to startup these groups 450, 460 and 470 in succession at a time interval equal to the time required for the disk drives to reach the prescribed rotational speed following start-up. It can be easily understood that the effect of the invention is obtainable with this arrangement. Therefore, the start-up sequence is: the master disk drives 440 are all first started up during a first period of time; and this is followed by a second period of time wherein the disk drives other than the master disk drives 440 are started up within start up group 450; thereafter, the disk drives other than the master disk drives 440 are then started up in start up group 460; and thereafter the disk drives other than the master disk drives 440 are started up in group 470.

Figure 11:
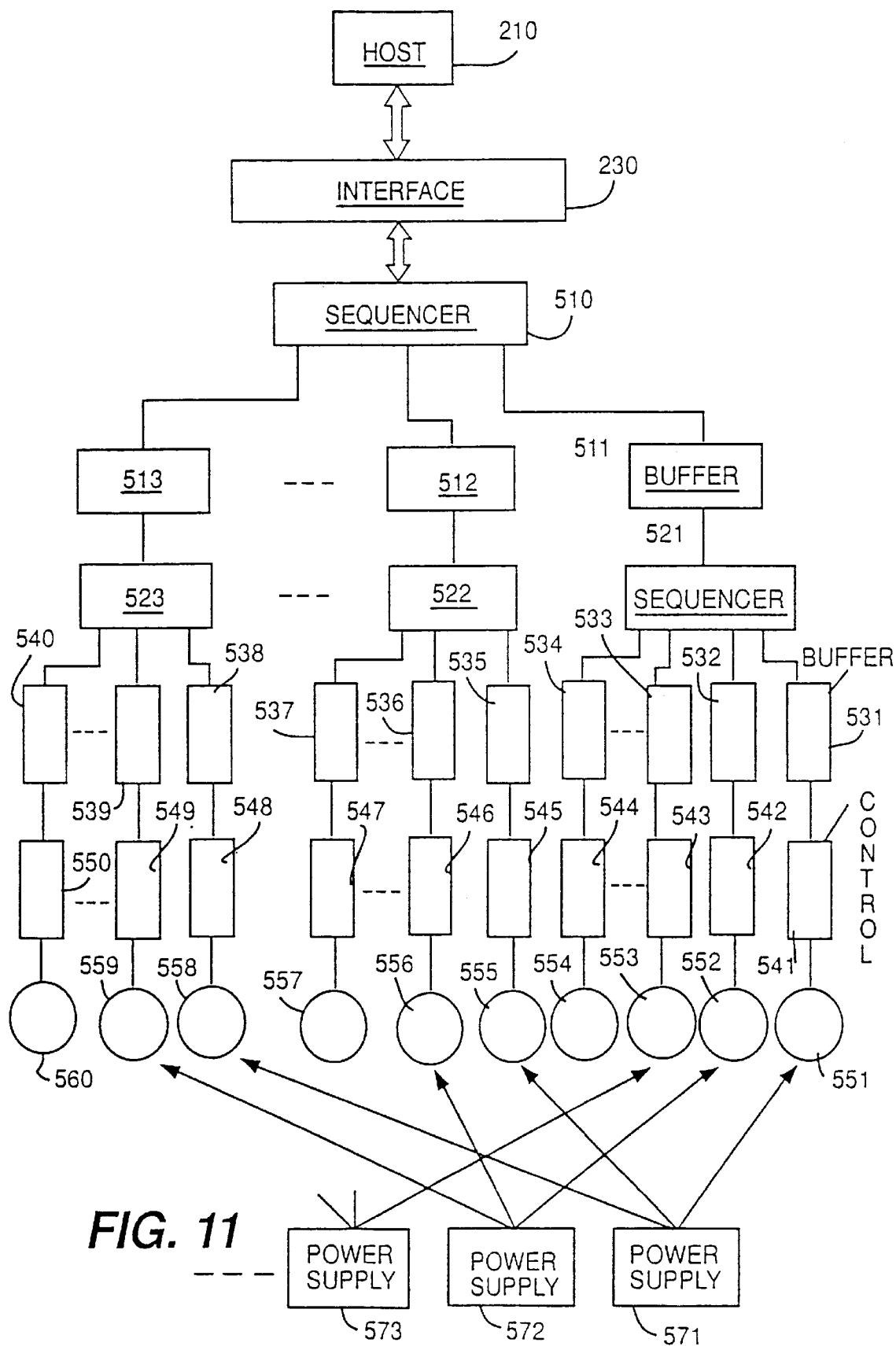
FIG. 11 is a schematic view of another embodiment of the invention.

In FIG. 11, magnetic disk drives 551–560 are represented as circles. Since this example is aimed at achieving a very high transfer rate, a number of parity groups each constituted of a plurality of disk drives are arranged in parallel and reading and writing operations are conducted with respect to all of the disk drives simultaneously. More specifically, when data to be stored is received from the host 210, it passes through an interface 230 to a first sequencer 510 where it is subdivided into units of an arbitrary size. These data units are temporarily stored in first buffers 511–513 and then are further subdivided in sequencers 521–523. The subdivided data are written to the magnetic disks 551–560 via second buffers 531–540 and logical control circuits 541–550. This process is reversed during data regeneration.

Although it is possible to provide each disk drive in this arrangement with its own separate power supply, the number of power supplies required would be very large. A better arrangement can be realized by taking advantage of the fact that each parity group (constituted by the disk drives under one of the sequencers II) includes a redundant or parity disk drive. If power supplies are provided so that each supplies power to only one disk drive in each parity group, specifically if a power supply 571 is provided to supply power to disk drives 551, 555, and 558, a power supply 572 is provided to supply power to disk drives 552, 556 and 559 and so on, reading and writing will be possible with ECC even if one of the power supplies should break down. It is thus possible to realize a system with high reliability.

Being common to the whole system, the interface 230, the sequencer 510, the buffers 511–513 and the sequencers 521–523, for ensuring high reliability, preferably should be provided with a power supply separate from that for the magnetic disk drives to establish a dual power system. Even though the buffers 531–540 and control circuits 541–550 are part of the same power groups, they are logical circuits and preferably should have a different voltage power supply. It is, however, contemplated to supply them with stepped-down voltage from a power supply for driving the disk drives.

The power groups constituted such that each power supply supplies power to one magnetic disk drive in each parity group in the manner of FIG. 11 are started with exactly the same method and arrangement as in FIG. 1 and the effect of the invention is thus manifested.

The power supplies of disk drives are sometimes equipped with batteries for supplying power during power outages and emergencies. When the invention is applied to such a battery backed up system, it reduces the load on the batteries when they are used for starting up the disk system and further upgrades system reliability.

In the foregoing, the invention was explained with respect to systems employing magnetic disk drives. It is obvious, however that the invention can also be applied with good effect to systems employing optical disk drives, hard or floppy disk drives, or the like insofar as the spindle motors of the drives exhibit characteristics like those shown in FIG. 4.

Moreover, the description up to this point has been limited to a power-on sequence or start-up for the disk drive groups which enables power to be supplied to the disk drives with high efficiency at start-up. However, a disk drive puts an increased load on its power supply from certain elements not only at power-on but also 1) during seek operation when a disk actuator equipped with a plurality of magnetic heads operates to position the heads at target track positions on the disks, and 2) when a read-write amplifier is operated for conducting read and write operations. Those operations also involve a risk of power supply overload should they be conducted with respect to all the disk drives of a power group at the same time. When the present invention is applied, however, since the disk drives are organized in groups and the operational timing is shifted between the respective groups, overloading of the power supplies can be avoided.

In accordance with this invention, since disk drive groups are started up one at a time, the power supplies for powering the disk drives need not be larger than necessary for supplying current required by all the disk drives in steady state operation. Moreover, the time required for all of the disk drives to reach their rated rotational speed can be shortened.

Moreover, in a system which must as a whole be operated by battery, the application of the present invention, through its effect of reducing the time required for start-up and its effect of suppressing the maximum load current, enables the use of small capacity batteries.

FIG. 12(*a*) is a block diagram of a part of the system relating to data storage and FIGS. 12(*b*) and 12(*c*) are views for explaining the data storage. As shown in FIG. 12(*a*), a CPU 1 is connected by a bus to an array disk controller (ADC) 2 and an array disk unit (ADU) 3.

The ADU 3 has a plurality (six being specifically shown) of parity groups 4, each of which has a group controller (GC) 5, four data disk drives D (7) and one parity disk drive P (8). The system inputs and outputs data between the data and parity disk drives 7, 8 and the CPU 1 via data lines 6. Electric current is supplied from a power supply 10 to the respective parity groups 4 via power lines 9. The number of data disk drives 7 and parity disk drives 8 is determined in light of the amount of power the system is capable of supplying.

Each parity group 4 has a unit for generation of parity bits. One parity bit is generated from the data bits of the respective data disk drives 7. Each of the data disk drives 7 and the parity disk drives 8 in the parity groups 4 is of the structure illustrated in FIG. 13.

The disks of this drive rotate at 3,600 rpm (requiring 16.6 ms per revolution) and the data transfer rate from the disks is 3 MB/s. Data is recorded on concentric tracks on the disks. The track positions are defined on each disk by fixed positions of a single R/W head 13. R/W heads #0 to #8 are positioned at corresponding track positions on the disk 12 by an actuator 11. The actuator 11 moves all of the R/W heads 13 simultaneously and by the same distance. A single positioning operation by the actuator 11 determines 9 tracks corresponding to the R/W heads #0 to #8 and these 9 tracks are collectively referred to as a cylinder. The amount of data that can be read from one disk during one revolution is called the track data capacity. Where this capacity is 35 KB and there are 9 R/W heads per cylinder, the cylinder data capacity becomes 35×9=315 KB.

Presuming a system of the type shown in FIG. 12(*a*), which has five parity groups 4, an example will now be explained regarding a case in which the CPU 1 issues a 10 MB write request and the system conducts parallel writing of this data. (In this and the following embodiments, data read can be considered to be conducted in the same manner as data write). It will be understood from FIG. 14 that under the conditions just defined 2000 KB of data will be written to each of the five parity groups 4 to handle the 10 MB request. Thus it is necessary to write 500 KB of data to each of the four data disk drives 7 in each parity group 4.

Figure 15:
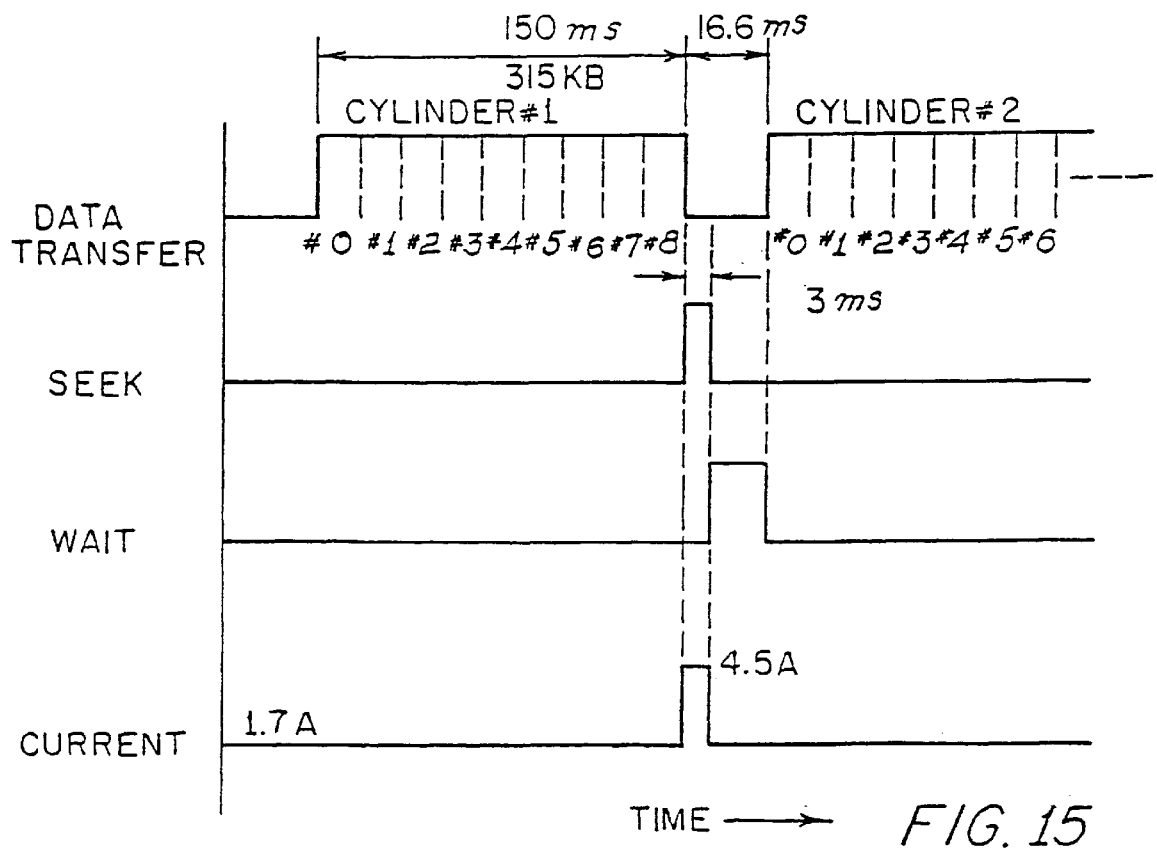
FIG. 15 is a timing chart relating to data storage in a data or parity disk.

FIG. 15 is a time chart relating to the processing conducted with respect to the data disk drives 7 and the parity disk drives 8 of the parity groups 4 in this case.

Of the data transferred from the CPU 1 to a disk drive, data up to 315 KB is stored in cylinder #1 and the remaining 185 KB is stored in cylinder #2. The head selector 14 first selects R/W head #0 according to a first seek operation and this head writes data to the corresponding track starting from the position of the index. This index serves as reference for the start of data writing. When writing of an amount of data corresponding to one revolution of the track under R/W head #0 has been completed, R/W head #1 is selected and an amount of data corresponding to one track is similarly written starting from the index. The switching between heads is done electrically and the time required therefor is substantially negligible. The aforesaid write processing is continued with R/W heads #2, #3, #4 . . . #8, after which the actuator 11 moves the R/W heads #0 to #8 in unison to the next cylinder according to a second seek operation. From the foregoing it will be understood that the time required for writing data to one cylinder is 9 times the time for one revolution of the disks 12, i.e. about 150 ms. When the writing of data is continued to an adjacent cylinder in the aforesaid manner, it is only necessary for the actuator to carry out a seek operation for moving the group of R/W heads to the adjacent cylinder. This requires a seek time of about 3 ms, during which the disks rotate by 3/16.6 revolution or approximately 1/5 revolution. There is thus a wait until the index next arrives and writing can begin. Including this wait time, therefore, there occurs a period of 16.6 ms (equal to the period of one disk revolution) during which data transfer is impossible. In other words, it is necessary to complete the seek operation within the period of one revolution. The amount of current consumed at this time is generally about 1.7 A per data disk drive 7 or parity disk drive 8. When a seek operation is conducted, however, the amount of current required for this operation is the total amount of current required up to a maximum of 4.5 A. Since each parity group 4 includes four data disk drives 7 and one parity disk drive 8, i.e., a total of 5 disk drives, which perform the same operations, the maximum amount of current required by the parity group 4 during seek operation becomes 4.5 A×5=22.5 A. The power supply 10 supplies this current to the GCs 5 of the respective parity groups 4 via the power lines 9.

Figure 16:
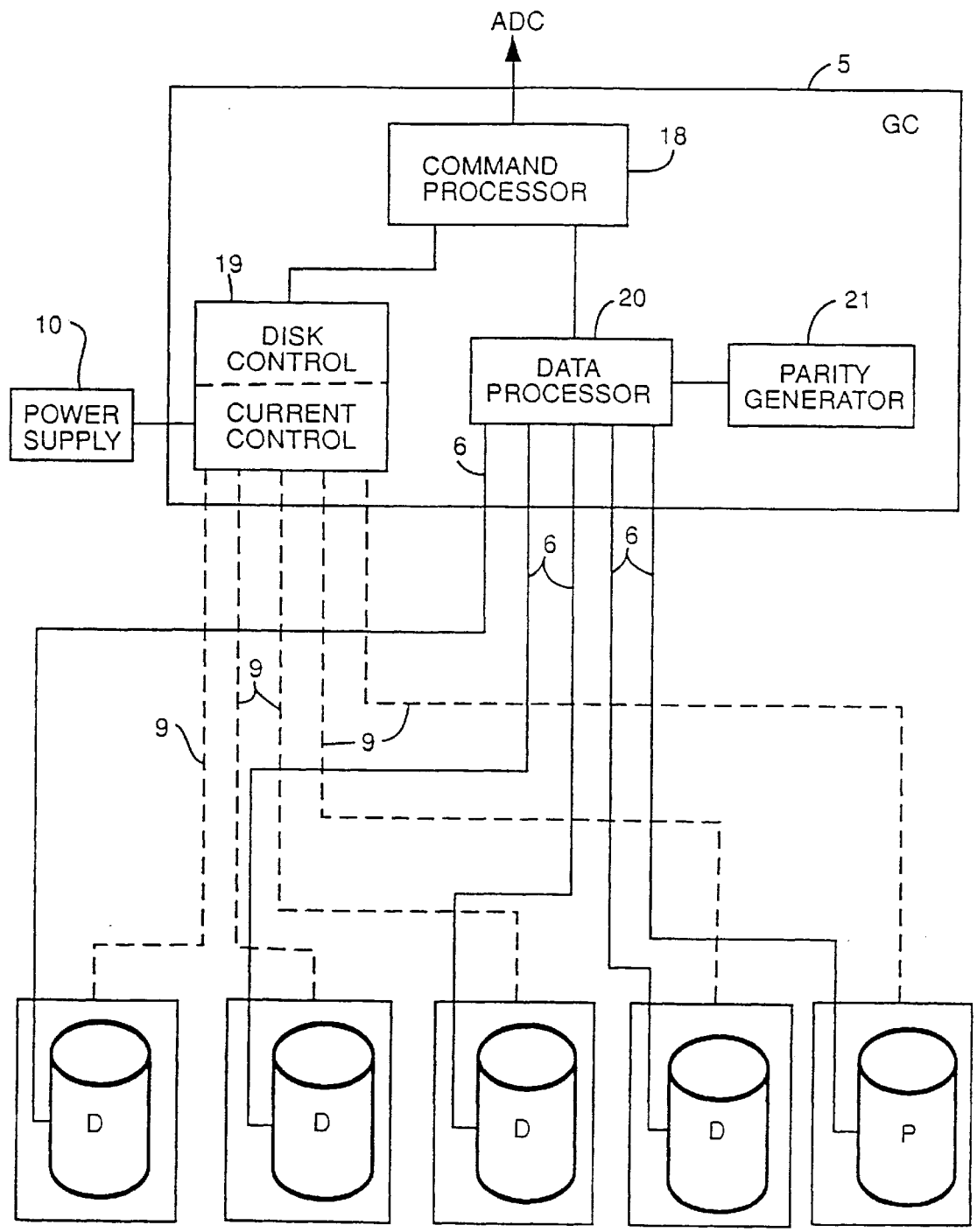
FIG. 16 is a block diagram showing the internal structure of a group controller.

As shown in FIG. 16, each of the GCs 5 comprises a command processor 18, a disk control 19, a data processor 20 and a parity generator 21. The command processor 18 processes commands between the ADC 2 and the group 4. Based on instructions received from the command processor 18, the disk control 19 carries out specific control within the parity group 4. The data processor 20 handles the subdivision and rebuilding of data between the host 1 and the parity group 4. Associated with the data processor 20 is a parity generator 21 for generating parity bits during data write and for reconstructing the data stored in a disk drive of the parity group 4 which has become unreadable because of a breakdown.

The disk control 19 synchronizes the rotation of the data disk drives 7 and parity disk drive 8 of the parity group 4 and controls the timing of the parallel processing within the parity group 4 exactly as if it were being conducted with respect to a single disk drive. It also maintains a check on whether the disk drives within the parity group 4 are operating normally and manages the supply of power within the parity group 4.

Timing control for rotation synchronization among the parity groups 4 is conducted by the ADC 2.

Figure 12B:
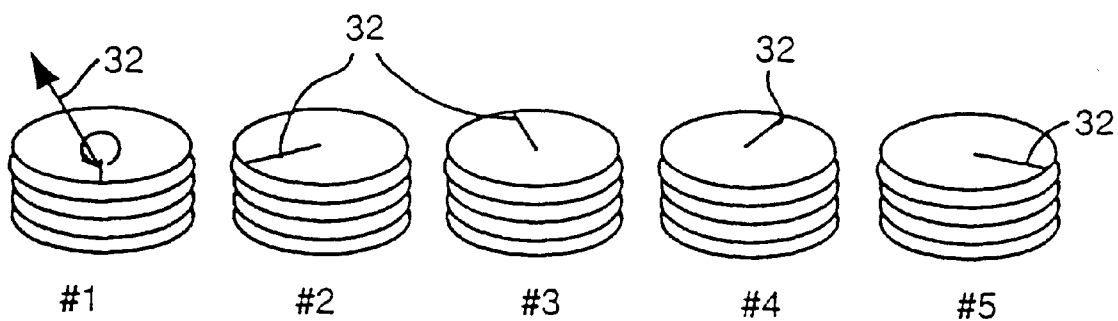
FIGS. 12(b) and (c) are diagrams for explaining data storage in the system of FIG. 12(a)
Figure 12C:
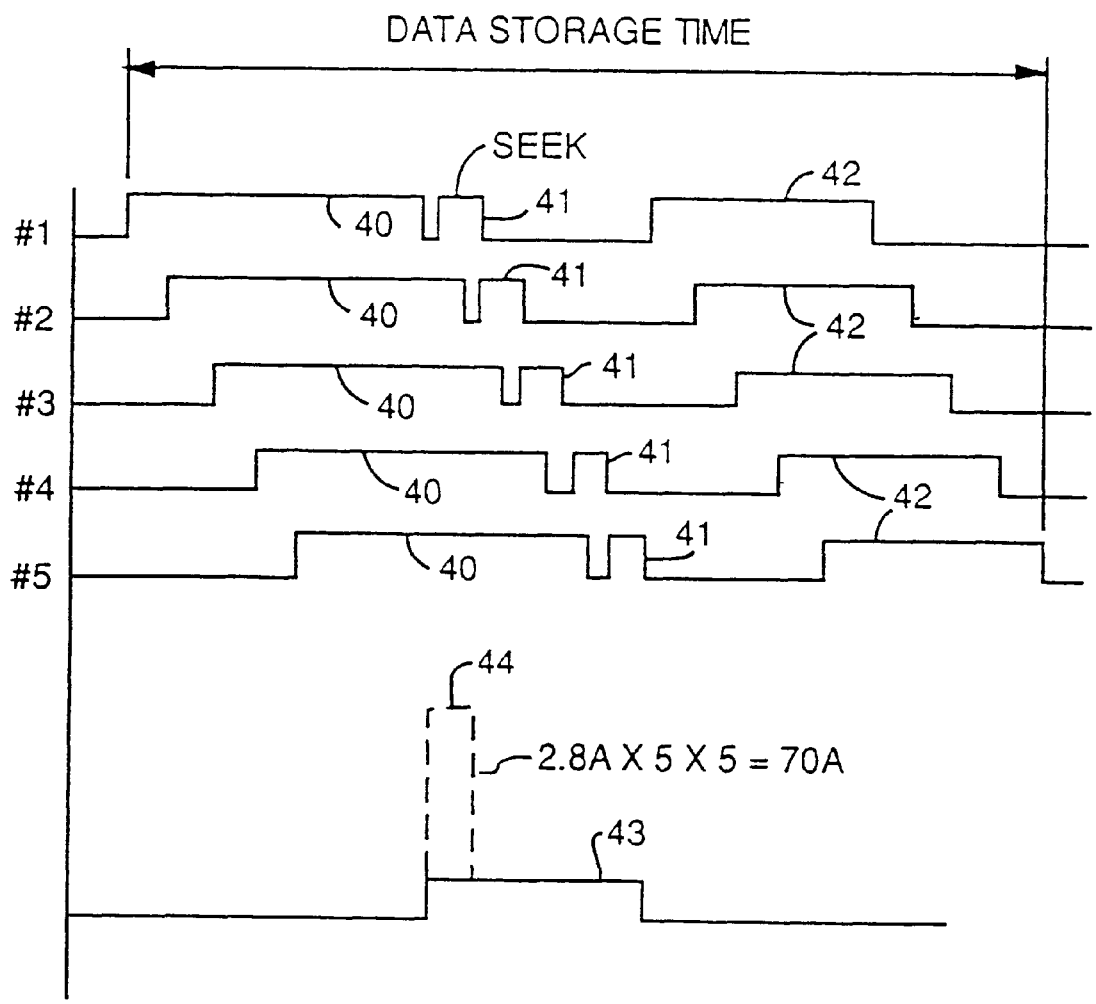

The ADC 2 subdivides the data transferred from the CPU 1 and allocates the subdivided data to the parity groups 4. It also controls the rotation synchronization timing of the respective parity groups 4 for ensuring that it does not become necessary to conduct a seek operation in any two of the parity groups 4 simultaneously. The specifics of this control are illustrated in FIGS. 12(b) and 12(c). FIG. 12(b) shows the relationship among the indices 32 on the disks among the rotation-synchronized data and parity disk drives 7, 8 of the respective parity groups 4. During parallel processing the positions of the indices from which data write is started are deliberately offset among the different groups as shown in FIG. 12(b).

The data transferred from the CPU 1 is subdivided by the ADC 2 and the subdivided data is simultaneously transferred to all of the parity groups 4. Within the respective parity groups 4, the data received is once stored in a buffer within the data processor 20 and is then independently stored in the data and parity disk drives 7, 8 of the respective groups. The data storage timing among the parity groups 4 at this time is indicated in FIG. 12(c). The data storage time is indicated for five different parity groups, namely parity group #1 through #5. With respect to each group, there is a data transfer time 40, a seek time 41, and a second data transfer time 42. These times are shown in synchronism with respect to each other and in synchronism with the seek current 43 according to the present invention when the indices are offset, which seek current has a maximum value of 14 A, calculated by multiplying the 2.8 A current required for each group, as explained above, times the five groups used in the example. In dotted lines, there is shown the total seek current 44 that would be required if the indices were not offset, according to the prior art, which would require a seek current of 70 A calculated by multiplying the same 2.8 A for one disk drive times the five disk drives that are in use at the same time times the five groups. Therefore, the advantage of offsetting the indices is clearly shown.

Figure 14:
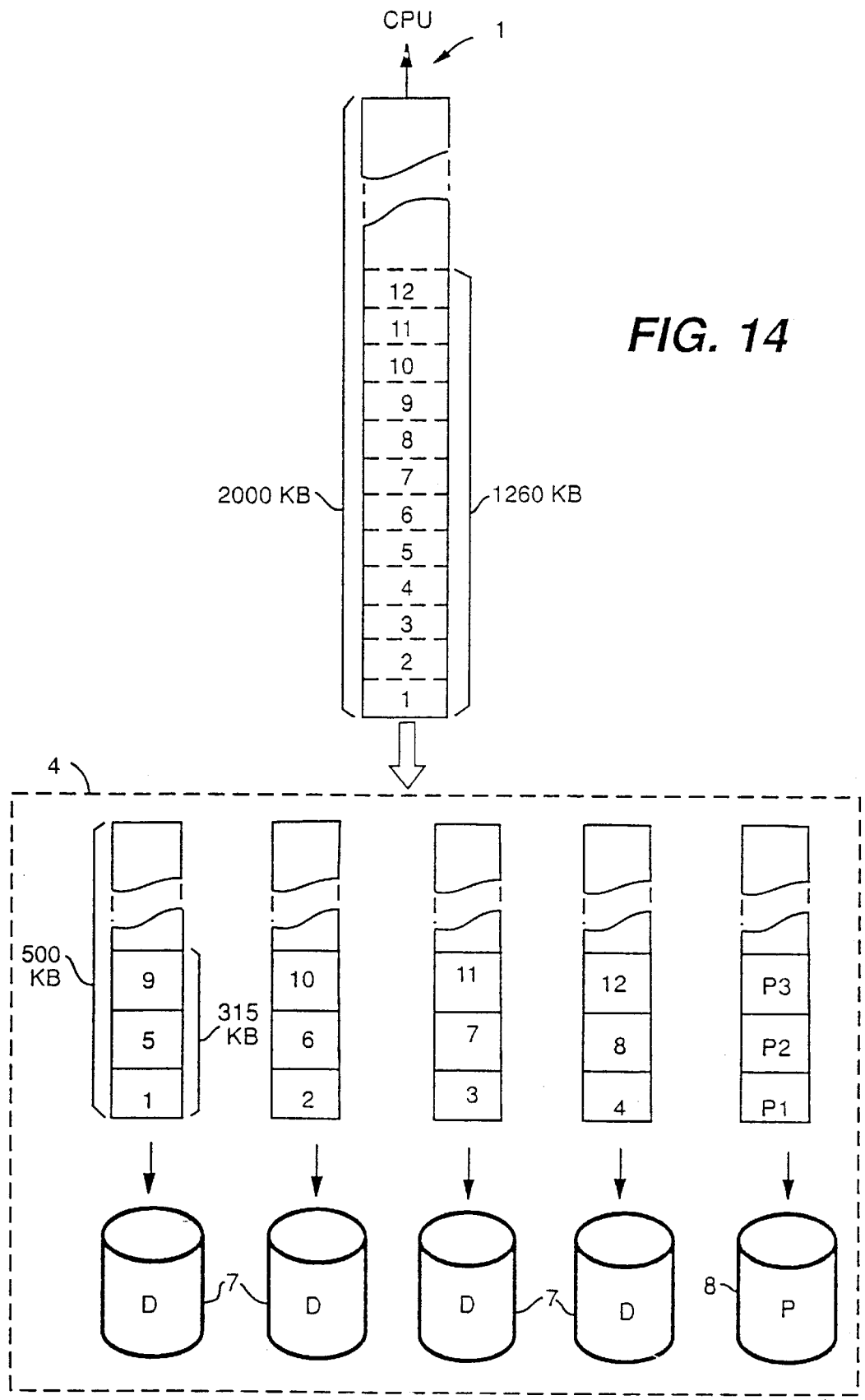
FIG. 14 is a diagram for explaining parallel processing of data.
Figure 17A:
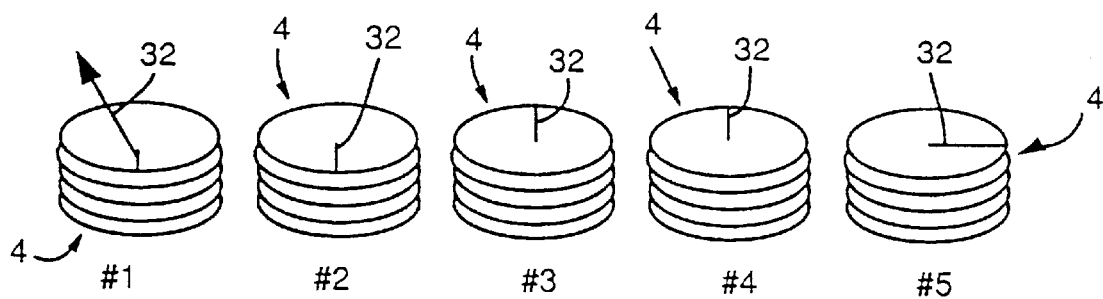
FIGS. 17(a) and 17(b) are diagrams for explaining another example of data storage in the present invention.
Figure 17B:
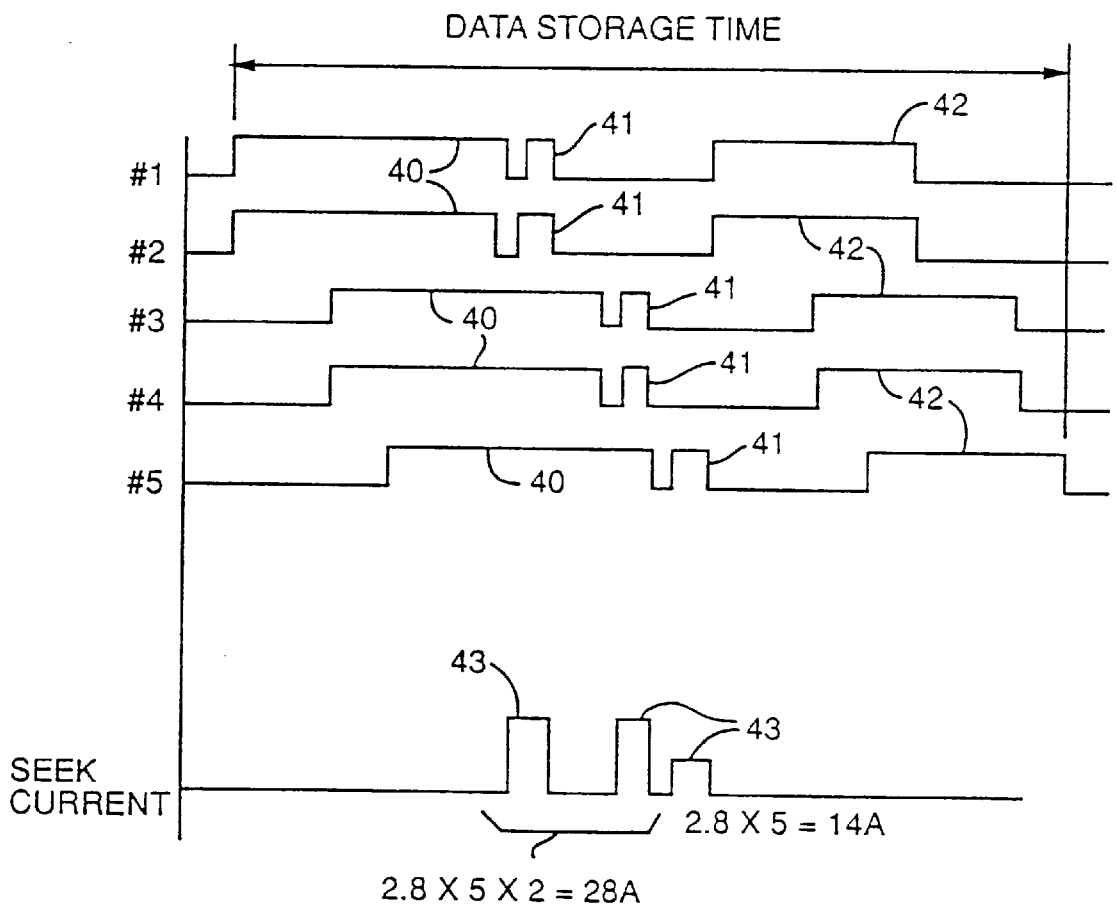

As shown in FIG. 15, when the amount of data to be stored to a data disk drive 7 in the parity groups #4 exceeds the capacity of one cylinder, it becomes necessary to conduct a seek operation for switching to another cylinder and, as a result, there occurs a one-revolution wait period in the course of data storage during which processing cannot be conducted. Thus, as shown in FIG. 14, the rotation of the disk drives within the respective parity groups 4 is synchronized such that the index of each parity group 4 making up the array of parity groups 4 is offset relative to the indices of the other parity groups 4 by at least the seek time. As a result, the timing of the start of seek operation comes to be offset among the parity groups 4. The amount of current that would have to be supplied to the system should the seek operation start timing not be offset would amount to 22.5 A ×5=122.5 A, the seek current portion of which is 2.8 A×5×5=70 A. In contrast, application of the invention reduces this to 4.5 A×5=22.5 A, the seek current portion of which is 2.8 A×5=14 A. The method in which this offset of the seek start timing is implemented is decided in light of the amount of current the system is capable of supplying. For example, where a current of 45 A is available for supply to five parity groups 4, it is possible to control the rotation synchronization timing of the parity groups 4 as shown in FIG. 17.

Since the invention enables operation at a lower seek current, the required current capacities of the power supply equipment and the emergency backup battery are also smaller, according to the present invention, which are considerable advantages.

Figure 18A:
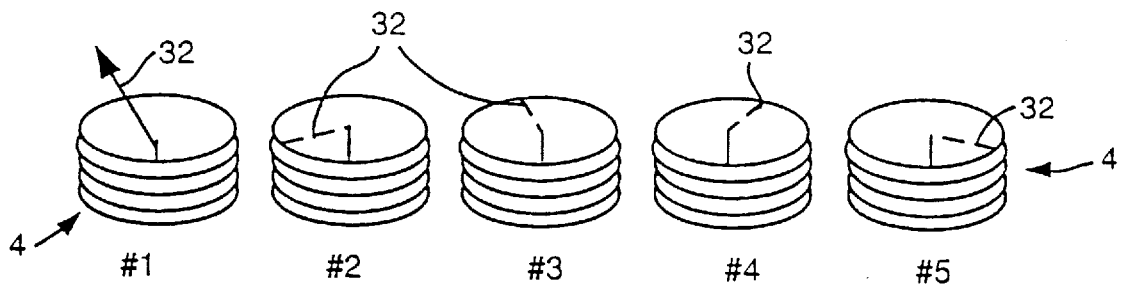
FIGS. 18(a) and 18(b) are diagrams for explaining another example of data storage in the present invention.
Figure 18B:
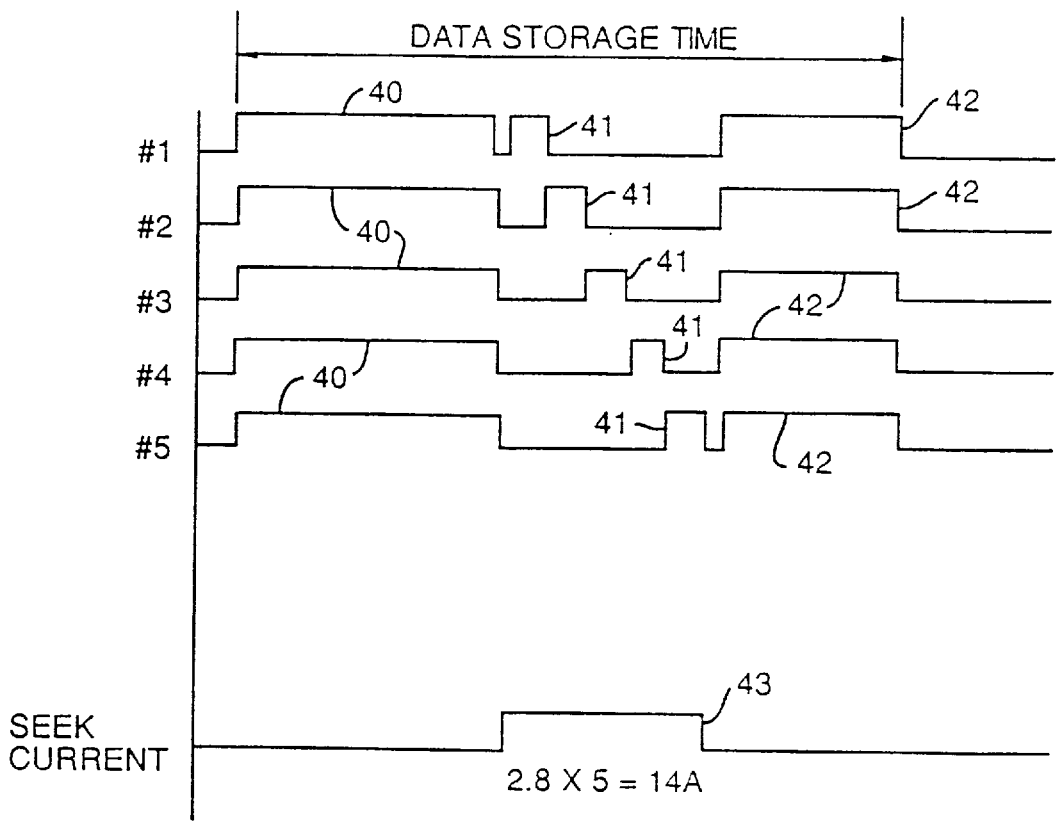

The array disk system of FIG. 18 is like that of FIGS. 12, 11 but instead of offsetting the indices among the groups, the embodiment of FIG. 18 rotation synchronizes the disk drives of the parity groups 4, making up the array of parity groups 4 conducting parallel processing, such that the indices thereof are in phase. While this makes it possible to carry out data storage simultaneously with respect to all parity groups 4 constituting the array of parity groups 4 in FIG. 18, without the present invention it causes all of the seek operations to occur at one time. In this embodiment, therefore, the seek operation start timing signals are offset among the five parity groups 4, #1, #2, #3, #4, & #5 in FIG. 18, making up the array of parity groups, such that the seek operations start at different timings from the indices for the corresponding different groups.

A seek operation ordinarily begins as soon as data storage to the cylinder has been completed up to the track under R/W head #8. In FIG. 18, however, the seek operation start timing is deliberately offset by different amounts among the different parity groups 4, respectively. The method in which the seek operation start timing is offset among the parity groups 4 will now be explained.

As shown in FIG. 15, when an amount of data exceeding the capacity of a single cylinder is to be stored in a data disk drive 7 of a parity group 4, a seek operation becomes necessary for moving to the adjacent cylinder.

The GC 5 begins storing data to the track concerned after detecting the index thereon. When a seek operation occurs in the course of storing data, it takes about 3 ms to move the R/H heads to the neighboring tracks at which data storage is to be continued. By the time the seek operation has been completed, the disk has rotated by 3/16.6 revolution. When this period is up, the index has already passed by the head so that it is necessary to wait until the index comes around again.

Thus, even though the seek operation itself is completed in 3 ms, in actuality a wait period (a period during which processing cannot be conducted) equal in length to the time required for one revolution of the disk occurs in the course of data storage. Since the system simply waits during this period and cannot carry out any processing, this time can be used for sequentially completing the seek operations in the respective parity groups 4.

In each parity group 4, the seek operations are managed by the disk control portion 19 in the GC 5.

The ADC 2 sets the seek offset times for the respective parity groups 4 making up the array of parity groups 4 in advance and forwards instructions indicating these times to the disk control portions 19 of the GCs 5. Based on the instruction it receives, the disk control portion 19 does not initiate a seek operation as soon as storage to the track under R/W head #8 has been completed but instead delays the start of the seek operation by the offset time indicated in the instruction from the ADC 2. Taking the specific example of conducting parallel processing with the five parity groups 4 shown in FIG. 18, while a seek operation is started immediately after completion of storage to the track under R/W head #8 in the disk drives of group #1, the initiation of the seek operation in group #2 is delayed until the seek operation in group #1 has been completed. The seek operations in the remaining parity groups 4 are similarly offset such that seek in group #3 is started after completion of seek in group #2, seek in group #4 after completion of seek in group #3, seek in group #5 after completion of seek in group #4, and so on. The data and parity disk drives 7, 8 of the respective parity groups 4 are rotation synchronized and seek operation occurs simultaneously in all the data and parity disk drives 7, 8 of the same parity group 4. The time required for the seek operation to move the R/W heads to the adjacent track is about 3 ms. Thus where the seek start times are offset in the foregoing manner, the seek operations in all of the parity groups 4 involved in the parallel processing are completed within the one-revolution wait period during which data transfer processing is impossible.

The seek operation timing is automatically controlled by controlling the seek operation of the GCs 5. In this method, even when it becomes necessary to write to the next cylinder because the amount of data exceeds the capacity of a single cylinder, the CPU 1 is not made aware of this fact and the seek operation for moving to the adjacent track for continuing the writing of data is conducted automatically by the GC 5.

The offsetting of the seek operations can be realized by the simple expedient of using software techniques to offset the times at which the ADC 2 issues its commands. Moreover, since the disk indices are all in alignment, control for rotation synchronization is easy to conduct.

Alternatively, it is possible to offset the locations at which information indicating seek operation start time are recorded on the disks.

With the operating systems (OS's) currently used in mainframe computers, it is not possible with a single input/output request to process a large amount of data bridging a plurality of cylinders as is the case in seek Embodiments 1 and 2. The maximum amount of data that can be processed by a single input/output request is limited to the capacity of a single cylinder. Thus where a large amount of data bridging a plurality of cylinders is processed, it is necessary to allot one input/output request per cylinder and the host is required to issue as many input/output requests as there are cylinders involved. When, for example, parallel processing is conducted in the manner shown in FIG. 18, namely where data is stored bridging cylinders #1 and #2 in five parity groups 4, the CPU 1 of the mainframe issues a single input/output request for storage of data to cylinder #1 and then, after seek operation has been completed following issuance of a seek command, issues another single input/output command for storage of data to cylinder #2.

In each instance, the CPU 1 issues only one seek command for all of the parity groups 4 making up the array conducting parallel processing. The ADC 2 issues this seek command to the GCs 5 of the respective parity groups 4 conducting the parallel processing but, as shown in FIG. 18(*b*), in doing so it offsets the issuance of the seek command among the GCs 5 of the different parity groups 4, thus offsetting the seek operation start timing.

When this method is used, it becomes possible, similarly to the case of the other embodiments, to complete seek operation with respect to all of the parity groups 4 involved in the parallel processing within the one-revolution wait period during which data transfer processing is impossible.

Figure 19A:
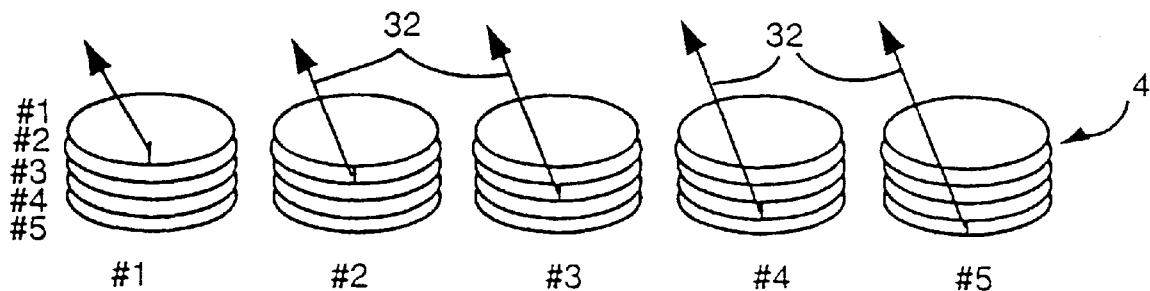
FIGS. 19(a) and 19(b) are diagrams for explaining another example of data storage in the present invention.
Figure 19B:
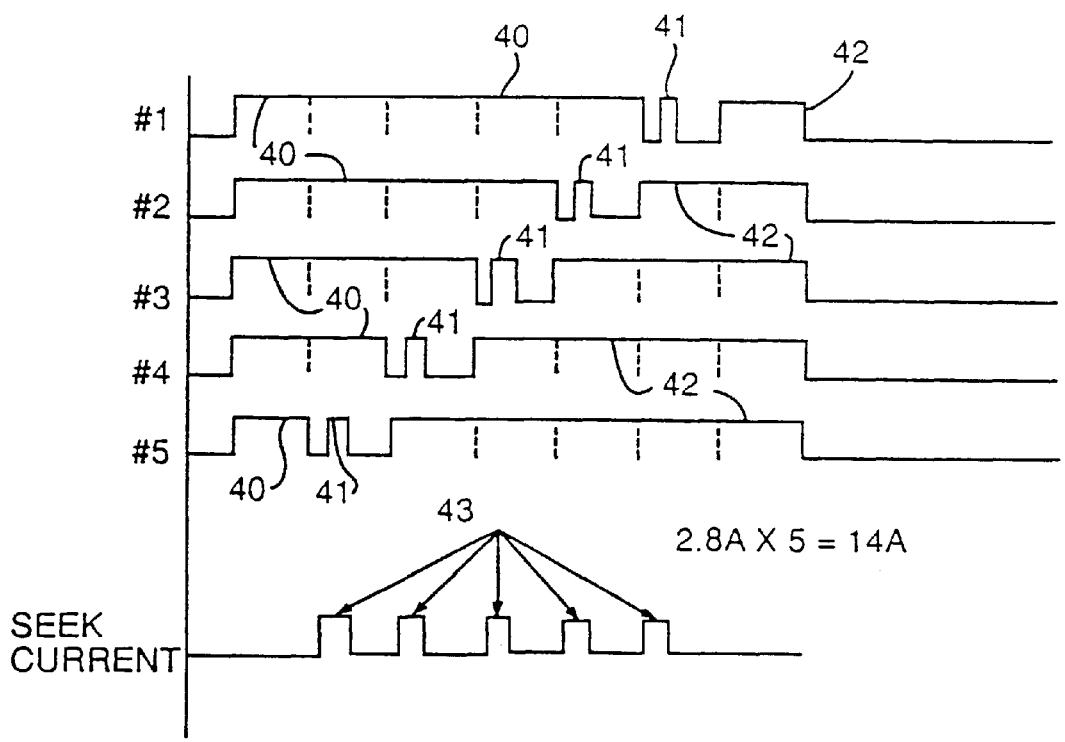

Data is stored at the same head address and the same cylinder address in all of the parity groups 4 making up the array of parity groups 4 conducting parallel processing. As shown in FIG. 19, in the present embodiment the head address from which data storage is started is varied among the groups at the time of starting data storage. While the ADC 2 sets the same data storage start address for all parity groups 4 making up the array of parity groups 4 in advance and forwards an instruction indicating this time to the disk control portions 19 of the GCs 5, the command processing portions 18 of the GCs 5 changes this head address.

Consider, for example, the arrangement shown in FIG. 19(*a*) in which each of the data disk drives 7 and parity disk drives 8 of the five parity groups 4 has five disks and read/write is conducted with respect to only the upper surface of each disk. In this case, each cylinder consists of five tracks. Where data is an amount equal to the capacity of six tracks is to be stored in each group, in group #1 writing of data is started from head #1, proceeds through heads #2, #3, #4 and #5, and then, following a seek operation, continues at head #1 of the next cylinder. In group #2, storage starts from head #2, proceeds through heads #3, #4 and #5, and then, after a seek operation, continues at heads #1 and #2 of the next cylinder. In group #3, storage starts from head #3, proceeds through heads #4 and #5, and then, following a seek operation, continues at heads #1, #2 and #3 of the next cylinder. In group #4, storage starts from head #4, proceeds through head #5, and then, following a seek operation, continues at heads #1, #2, #3 and #4 of the next cylinder. In group #5, storage starts from head #5 and then, following a seek operation, continues at heads #1, #2, #3, #4 and #5, of the next cylinder. Varying the head address for the start of data storage among the different parity groups 4 in this manner also causes the seek operation start timing to be offset among the different parity groups.

The ADC 2 sends the same data storage start address instruction to the disk control portions 19 of the GCs 5 of all the parity groups 4 making up the array and the individual command processing portions 18 change this address. It is obvious, however, that the same effect can also be obtained by having the ADC 2 change the data storage start address and send instructions based on the changed address to the GCs 5.

In the above description, it was explained how, by offsetting the seek operation start timing among different parity groups 4, the invention achieves its object of preventing the occurrence of the large current which arises when a large number of seek operations occur simultaneously in an array of parity groups 4 conducting parallel processing. This same thinking can obviously also be applied for offsetting read and write start timing so as to reduce the amount of current required during these operations.

The head addresses can be varied by software techniques, which is advantageous in that it expedites the control for seek operation offset.

While the foregoing relates to cases in which the seek start timing is offset among the groups, the same results can be obtained by offsetting the seek operation start timing among the disk drives in one and the same group.

Application of the invention reduces the current to be supplied to the array disk system and also reduces the capacity required of a battery provided for preventing loss of data owing to power outages and the like. It thus becomes possible to provide battery backup over a long period of time with a battery of relatively small capacity, thus enhancing reliability against the risk of data loss resulting from power outages. Furthermore, the invention also makes it possible to reduce the size of the system's power supply equipment.

With respect to FIG. 19(*b*), each of the first and second data transfer periods 40, 42 respectively for the groups #1 to #5, is divided by vertical dashed lines. For group #1, data transfer period 40 is divided into subperiods for head #1, head #2, head #3, head #4, head #5 respectively proceeding from left to right for a first cylinder and the second data transfer period 42 is for head #1 of cylinder 2. With respect to the second parity group #2, the data transfer period 40 is divided into 4 subperiods respectively for head #1, head #2, head #3, head #4 of cylinder #1, and the second data transfer period 42 is divided into two subperiods for head #1 and head #2 of cylinder #2. With respect to parity group #3, #4, #5, the data transfer periods 40 are respectively divided into 3, 2 and 1 subperiods for head numbers 1, 2, 3 head numbers 1, 2 and head numbers 1, respectively, each for cylinder 1;

the second data transfer period 42 is divided respectively into 3, 4 and 5 subperiods respectively for head numbers 1, 2, 3 head numbers 1, 2, 3, 4 head numbers 1, 2, 3, 4, 5 each for cylinder #2 of the respective parity groups. The seek current 41 for each group is shown. With this, it is seen that the current 43 has five current surges at timings 41, as shown, each of which is 14 amps, obtained by multiplying the 2.8 amps by 5. It is noted that according to the present invention the current surges do not overlap and therefore do not reinforce each other.

While a preferred embodiment has been set forth along with modifications and variations to show specific advantageous details of the present invention, further embodiments, modifications and variations are contemplated within the broader aspects of the present invention, all as set forth by the spirit and scope of the following claims.

What is claimed is:

1. An array disk system, comprising:
   a plurality of disk drives which are divided into groups, at least one disk drive group having plural disk drives, and each disk drive of each disk drive group having a spindle motor; and
   a spindle motor control circuit for setting a different respective time between power switch-on of the array disk system and start of spindle motor driving for at least two of the disk drive groups.

2. An array disk system according to claim 1, wherein the sum of currents being delivered to all of the spindle motors that are being driven at any given time never exceeds the sum of steady-state currents of all of the spindle motors.

3. An array disk system according to claim 1, wherein said array disk system includes at least one parity group, wherein each parity group has a master disk driven by one of said plurality of disk drives, and wherein the disk drives that drive all master disks of said at least one parity group belong to a common one of said plural disk drive groups.

4. An array disk system according to claim 1, wherein said array disk system includes at least one parity group, wherein each parity group has a master disk driven by one of said plurality of disk drives, and wherein the spindle motors of the master-disk disk drives are started up one-by-one before start-up of any other of said spindle motors.

5. An array disk system according to claim 1, wherein said spindle motor control circuit further sets a respective time between power switch-on of the array disk system and start of driving of at least two of the spindle motors independently within at least one of said at least one disk drive group.

6. A disk system according to claim 1, wherein at least one of said at least one disk drive group has a single common spindle motor start time for all spindle motors of the disk drive group.

7. A disk system according to claim 1, wherein at least two of the spindle motors in a disk drive group of said at least one disk drive group receive start-up power simultaneously.

8. An array disk system, comprising:
   a plurality of disk drives having spindle motors driven by a plurality of spindle motor power supplies, one spindle motor power supply of said plurality of spindle motor power supplies driving plural spindle motors; and
   a spindle motor power supply control circuit for controlling drive current delivery from said plurality of spindle motor power supplies to said spindle motors by setting different respective times between power switch-on of the array disk system and start of drive current delivery for each of the plurality of spindle motor power supplies.

9. An array disk system according to claim 8, wherein the sum of currents being delivered to all of the spindle motors that are being driven at any given time never exceeds the sum of steady-state currents of all of the plurality of spindle motors.

10. An array disk system according to claim 8, wherein said spindle motor power supply control circuit controls drive current delivery from said plurality of spindle motor power supplies to said spindle motors by setting different respective times between power switch-on of the array disk system and start of drive current delivery for each of the spindle motors independently.

11. A disk system according to claim 8, wherein said spindle motor power supply control circuit controls drive current delivery from said one spindle motor power supply that drives plural spindle motors so that all of said plural spindle motors driven by said one spindle motor power supply simultaneously receive start of drive current delivery.

12. A disk system according to claim 8, wherein said spindle motor supply control circuit controls drive current delivery from said one spindle motor power supply that drives plural spindle motors so that at least two of said plural spindle motors driven by said one spindle motor power supply simultaneously receive start of drive current delivery.

* * * * *